(12) United States Patent
Jeong

(10) Patent No.: US 10,789,856 B2
(45) Date of Patent: Sep. 29, 2020

(54) CONTEXT-AWARE ADAPTIVE DATA PROCESSING APPLICATION

(71) Applicant: Charis YoungJoo Jeong, Jersey City, NJ (US)

(72) Inventor: Charis YoungJoo Jeong, Jersey City, NJ (US)

(*) Notice: Subject to any disclaimer, the term of this patent is extended or adjusted under 35 U.S.C. 154(b) by 276 days.

(21) Appl. No.: 15/657,847

(22) Filed: Jul. 24, 2017

(65) Prior Publication Data

US 2018/0012507 A1 Jan. 11, 2018

Related U.S. Application Data

(63) Continuation-in-part of application No. 13/135,184, filed on Jun. 28, 2011, now abandoned.

(30) Foreign Application Priority Data

Jun. 29, 2010 (KR) .................. 10-2010-0062149

(51) Int. Cl.
G09B 7/00 (2006.01)
G09B 7/08 (2006.01)

(52) U.S. Cl.
CPC .................. *G09B 7/08* (2013.01)

(58) Field of Classification Search
CPC ... G09B 5/00; G09B 5/02; G09B 7/00; G09B 7/07; G09B 7/077
See application file for complete search history.

(56) References Cited

U.S. PATENT DOCUMENTS

| | | | | |
|---|---|---|---|---|
| 5,494,444 A | * | 2/1996 | Thayer | G09B 7/02 273/430 |
| 6,022,221 A | * | 2/2000 | Boon | G09B 5/065 434/118 |
| 6,652,283 B1 | * | 11/2003 | Van Schaack | G09B 7/00 434/236 |
| 2003/0170598 A1 | * | 9/2003 | Boggs | G09B 5/00 434/236 |
| 2009/0077479 A1 | * | 3/2009 | Tucci | G09B 5/02 715/764 |
| 2014/0272911 A1 | * | 9/2014 | York | G09B 5/08 434/362 |

* cited by examiner

*Primary Examiner* — Peter R Egloff
(74) *Attorney, Agent, or Firm* — Behmke Innovation Group LLC; Jonathon P. Western

(57) ABSTRACT

A context-aware adaptive data processing application is described. One or more computing servers establish connections with multiple user terminals to provide an application to the user terminals. The provided application is executable at the user terminals via web browser or a dedication application installed at a user terminal, for example. The provided application is context-aware to dynamically adapt to a user's changing circumstances.

4 Claims, 18 Drawing Sheets

| Learning topic ID | Sequence ID | Sequences | Performance Index | User IDs |
|---|---|---|---|---|
| 1 | 1 | X1, X2, ....Xn | 99 | {1, 2,.. 88, 99, z} |
| 1 | 2 | X2, X1, ....Xn | 97 | {2, 3, 4, ...101} |

| User ID | Sequence ID | Learning topic ID | Performance Score | Time stamp |
|---|---|---|---|---|
| 2 | 1 | 1 | 80 | .... |
| 2 | 2 | 1 | 99 | .... |
| 2 | 2 | 1 | 100 | .... |

FIG. 4

CONTEXT-AWARE ADAPTIVE DATA PROCESSING APPLICATION

CROSS-REFERENCE TO RELATED APPLICATIONS

This application is a continuation-in-part of U.S. patent application Ser. No. 13/135,184, filed on Jun. 28, 2011, which claims the benefit of priority to Korean Patent Application No. 10-2010-0062149, filed on Jun. 29, 2010. The entire contents of the aforementioned patent applications are incorporated herein by reference.

TECHNICAL FIELD

The present invention relates to a context-aware adaptive data processing application.

BACKGROUND

Many people use flash cards to study vocabulary words. In buses or subway trains, one can often observe students studying flash cards with vocabulary words on one side of the card and the associated meaning on the other side.

Not only vocabulary, but many other subject areas can be studied in word/definition or question/answer form. For example, to prepare for a mathematics exam, one can study flash cards with mathematical problems written on one side of the card and associated answers on the other side.

However, conventional flash card products have many disadvantages. Conventional flash cards products are inconvenient to carry around and are difficult to share with other people. Another drawback of using flash cards in tradition way (i.e. repeatedly reviewing each flash card one by one) is that it is difficult for the learner to draw or select flash cards that would give him or her the most learning benefits for his or her situation. The learner does not necessarily know what he or she does not know; therefore, he or she would not know which cards would be the most effective ones for him or her to review next. Also, the learner may not review the materials sufficiently in order to achieve the desired learning outcome, or may waste time studying the material only to realize later that he or she knows the material well enough already.

Computer based flash card study systems that implement the concept of flash card studying methods have been presented in the past. For example, "http://quizlet.com/" is a website that allows users to study flash cards online. The users can either study the flash cards that the website displays in predetermined order or quiz themselves by entering and reviewing their answers online. Most of these systems do not dynamically select the cards based on the users' progress, situations, and other users' learning statistics.

Also recently, a flash card application for smart-phone users has been introduced. Such application employs a method that displays the front and back side of the flash cards to the users on the phone.

The majority of these flash card applications, however, utilizes a method that simply displays a selected set of flash cards in random or some predetermined order. These systems also do not select the best set of cards for the users based on their situations. Thus, in cases where the users do not have much time to study, e.g., five minutes before an exam, it is difficult for them to quickly review the necessary flash cards only.

Therefore, an advanced flash card study system that provides the users with the material that would give them the most learning benefit during their available study time is highly desirable.

SUMMARY

The present invention aims to solve the aforementioned problem by selectively providing its users the study material, such as virtual flash cards, that best suits their studying situation (e.g., the flash card selection differs depending on whether the exam is in five minutes or in a month).

The invention effectively enhances the user's learning potential by automatically selecting and presenting study material that best suit the user's studying situation.

Also, the invention seeks to maximize the user's learning benefit or outcome by introducing a competition-based study method which allows two or more users to simultaneously utilize the study system.

The additional purpose of the invention is to help users achieve their course objectives or learning goals within their available time by customizing the study course and sessions to the user's learning ability and his or her available time to study.

Furthermore, when choosing the most appropriate study material for the users to study based on the users' available learning time, the invention takes into account the rate at which the users answer each of such study material correctly.

The present invention comprises three main features: (1) a course scheduling feature that divides the study course into a plurality of study sessions, selects and assigns virtual flash cards to each session, and determines the order of the said virtual flash cards; (2) a session management feature that displays the front side of such virtual flash cards and prompts users to supply answers to the corresponding problem; and (3) an entry management feature that provides the users the interface to enter such answers.

The course scheduling feature may consider the following factors when assigning the virtual flash card to a particular session and determining the order of such virtual flash cards: (1) a rate and percentage of correct answers given by the user for each of such virtual flash cards; (2) a rate and percentage of correct answers given by other users for each of such virtual flash cards; (3) time needed for such user to complete each of such virtual flash cards; and (4) time needed for such other users' to complete each of such virtual flash cards.

The course scheduling feature can further consider a changing pattern of rates and percentages of correct answers given by the user and/or other users for each virtual flash card that the user and for other users have answered for more than once throughout the study session and for study course when assigning such virtual flash cards to a particular session and determining the order of such virtual flash cards.

The arrangement and order may differ depending on whether the changing pattern of the rates and percentages of correct answers given by the user and/or other users for each such virtual flash card captures the increasing, decreasing or fluctuating trends of the percentages of correct answers for each such flash card. Two or more cards with the same rate and percentage of the user answering them correctly could have different trends depending on the order of which the user answered each such flash card correctly. When calculating the possibility of the user correctly answering such virtual flash cards, the invention may take into the account the learning progress of the user and that of other users.

The present invention further comprises the following features: (1) a flash card deck database that stores the arranged virtual flash card deck; (2) a performance reviewer that analyzes the user's performance for each session; (3) a statistic analyzer that quantifies such user's performance and that of other users; and (4) an authoring mode manager that allows the user to create his or her own virtual flash card deck.

Additionally, the invention comprises: (1) a client management feature that saves the virtual flash card decks shared by the users in the same course or class; (2) a class server that saves learning progress statistics of each user and that of the class members for each session and for the entire course; (3) a client training feature that processes such quantified performance with the client management feature; and (4) a central server superior to the class server.

Also, the session management feature supports a group study mode. In group study mode, the front side of the virtual flash card is displayed simultaneously to two or more users. The mode then provides the back side of such virtual flash card along with the answers that these users have entered.

In summary, the present invention provides a distinct studying method by dividing a study course into a plurality of study sessions, assigning virtual flash card decks to appropriate such study sessions and determining the order of such virtual flash cards, displaying the front side of such virtual flash cards to the user, and allowing the user to enter the answer for each virtual flash card.

In assigning the virtual flash card to a particular study session and determining the order of the said virtual flash cards, the following factors are considered: (1) the rate and percentage of correct answers given by the user for each of such virtual flash cards; (2) the rate and percentage of correct answers given by other users for each of such virtual flash cards; (3) time needed for such user to complete each of such virtual flash cards; and (4) time needed for such other users' to complete each of such virtual flash cards.

The changing pattern of the rates and percentages of correct answers given by the user and/or other users for each virtual flash card that the user and/or other users have answered for more than once is also considered in assigning virtual flash cards to a particular study session and determining the order of the virtual flash cards. For example, one user could have answered the material correctly for the first few times; however, as the user learns other materials as well the user may forget the previously learned material or confuse the old material with the new material. Therefore, as the system gathers the learning statistics of all users who use the system, the system can detect particular orders of the cards that negatively impact the user's recollection of previously learned materials, or negatively impact future learning materials, and avoid such ordering of the cards. The invention takes into account such ordering effects when selecting the cards based on the learners' progress, goals, and the available time left for studying.

Such studying method using virtual flash cards may provide a group study mode to users. In group study mode, the front side of the virtual flash card is displayed simultaneously to two or more users. The mode then displays the back side of such virtual flash card along with the answers that these users have entered.

The present invention effectively aids the users in achieving their study goals by selectively providing its users with virtual flash cards that best suits their studying situations (e.g., the virtual flash card selection differs depending on whether the exam is in five minutes or in a month).

The present invention also maximizes users' learning benefit by implementing a competition-based study method that allows two or more users to utilize the virtual flash card system simultaneously.

The invention also helps the users achieve their course objectives within their available time by scheduling the course work in accordance with the user's learning ability which is measured by his or her learning progress and statistics and his or her available time to study.

Finally, the invention effectively selects and provides virtual flash cards suitable to the user's studying condition by considering the change in rates and percentages of correct answers given by the user and his or her learning statistics and patterns.

BRIEF DESCRIPTION OF THE DRAWINGS

FIG. 4 illustrates a table mapping learning sequences against user IDs and user performance scores.

DETAILED DESCRIPTION OF THE EMBODIMENTS

The present invention will now be described in detail with reference to the drawings, which are provided as illustrative examples so as to enable those skilled in the art to practice the invention. The forms and proportions of the drawings may have been magnified in order to better aid with understanding. Those portions that are necessary for an understanding of the present invention will be described, and descriptions of other unnecessary portions will be omitted so as not to obscure the invention.

It is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Embodiments of the present invention will now be described in detail with reference to the drawings.

Figure 1:
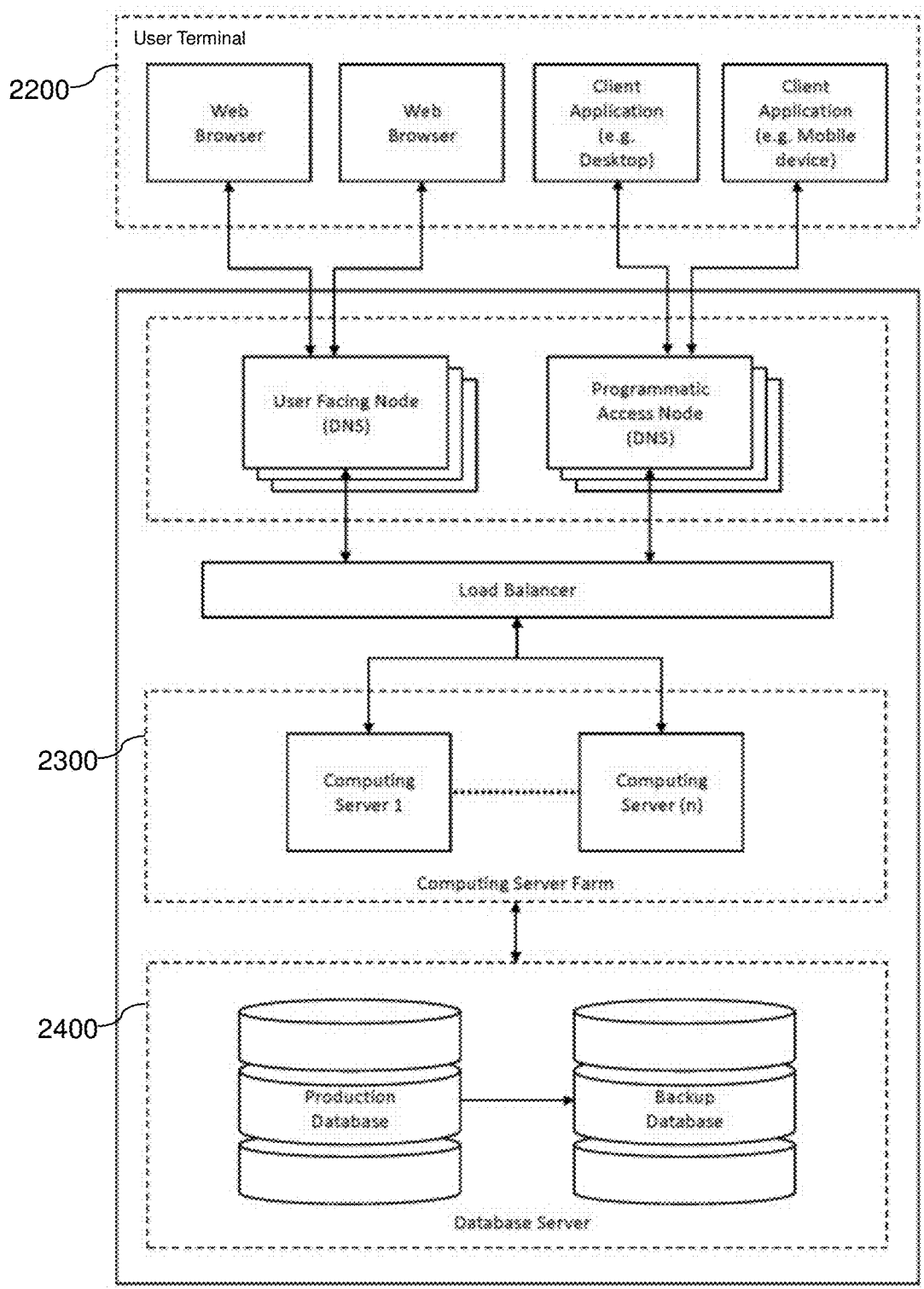
FIG. 1 is one embodiment of a block diagram of a data processing system.

FIG. 1 is one embodiment of a block diagram of a data processing system. As shown in FIG. 1, one or more computing servers 2300 (e.g., computing server_(1), computing server_(2), . . . computing server_(n)) establish a connection with a user terminal 2200 (via a network interface (not shown)) for the purpose of providing a study system to the user. Although a single user terminal 2200 is shown in FIG. 1, the computing servers 2300 are configured to communicate with a plurality of user terminal 2200, allowing for the study system to be carried out on each of the plurality of user terminal 2200. The study system can be executed by an end user using the user terminal 2200 through, for instance, a web browser installed on the user terminal 2200 or a dedicated application installed on the user terminal 2200. Also, the user terminal 2200 may assume various forms, such as, for example, a mobile device (e.g., smart phone, tablet, etc.), a desktop computer, or any other suitable computing device.

The computing servers 2300 can communicate with the user terminal 2200 through various intermediary devices, such as, for example, one or more domain name servers (DNSs), a load balancer, and so forth, as illustrated in FIG. 1. Furthermore, the computing servers 2300 can communicate with one or more databases 2400, or a database server, that store various information related to implementation of the study system, such as, for instance, study material which can be presented to a user, study session information relating to an upcoming or current study session (e.g., a selection of study material to be presented during a given study session, an arrangement of selected study material, a length of study session, etc.), study course information relating to a user's study course (e.g., a goal of the study course, a length of the study course, etc.), course scheduling information (e.g., dates and times of upcoming study sessions, information about the user's schedule, etc.), user performance history information (e.g., a rate and percentage of correct answers, a trend of the rate and percentage of correct answers, a time needed to provide correct answers, etc.), and the like. When the study system for a given user is carried out, the computing servers 2300 can utilize information stored in the databases 2400 pertaining to the given user as well as performance information of other users, for reasons described in greater detail hereinbelow.

Figure 2:
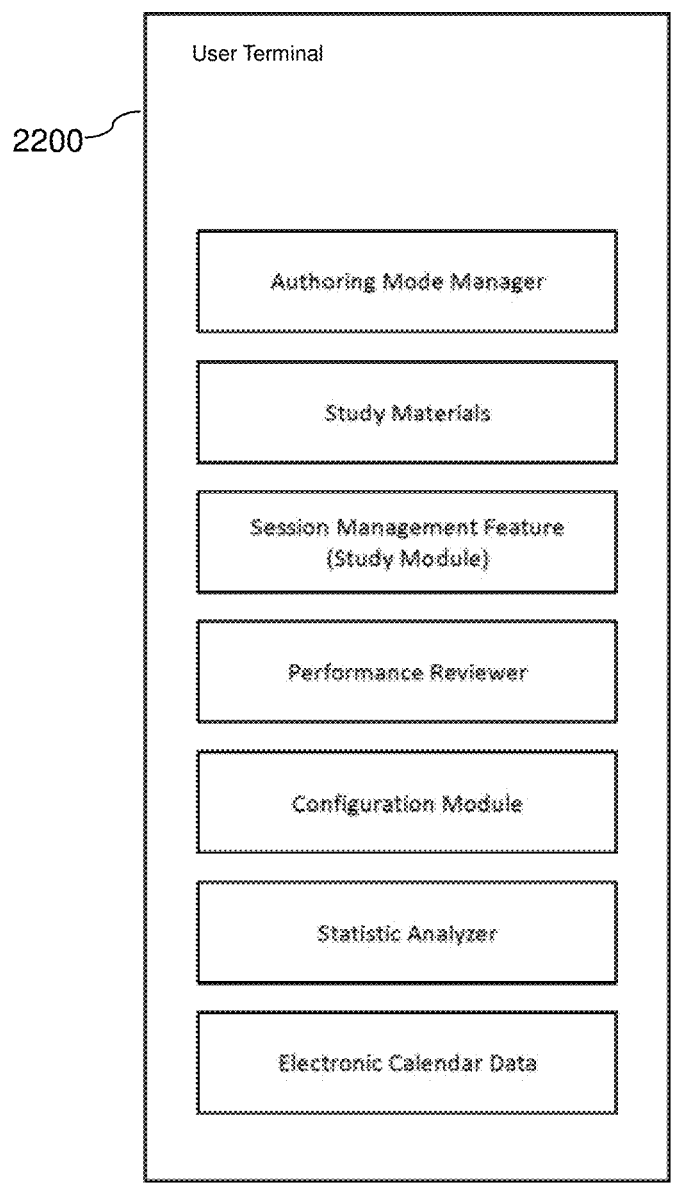
FIG. 2 is one embodiment of a user terminal.

FIG. 2 is one embodiment of the user terminal 2200. As shown in FIG. 2, the user terminal 2200, including a mobile device (e.g., smart phone, tablet, etc.), a desktop computer, or any other suitable computing device, may include several different modules (i.e., software modules installed on the device) for executing the study system at the user terminal 2200. For example, the user terminal 2200 may include various modules, such as study materials, an authoring mode manager, a session management feature (i.e., study module), a performance reviewer, a configuration module, a statistics analyzer, calendar data, and so forth. As described in greater detail hereinbelow, particular tasks may be assigned to each of the respective modules, thereby distributing processing responsibilities among the various modules.

Figure 3:
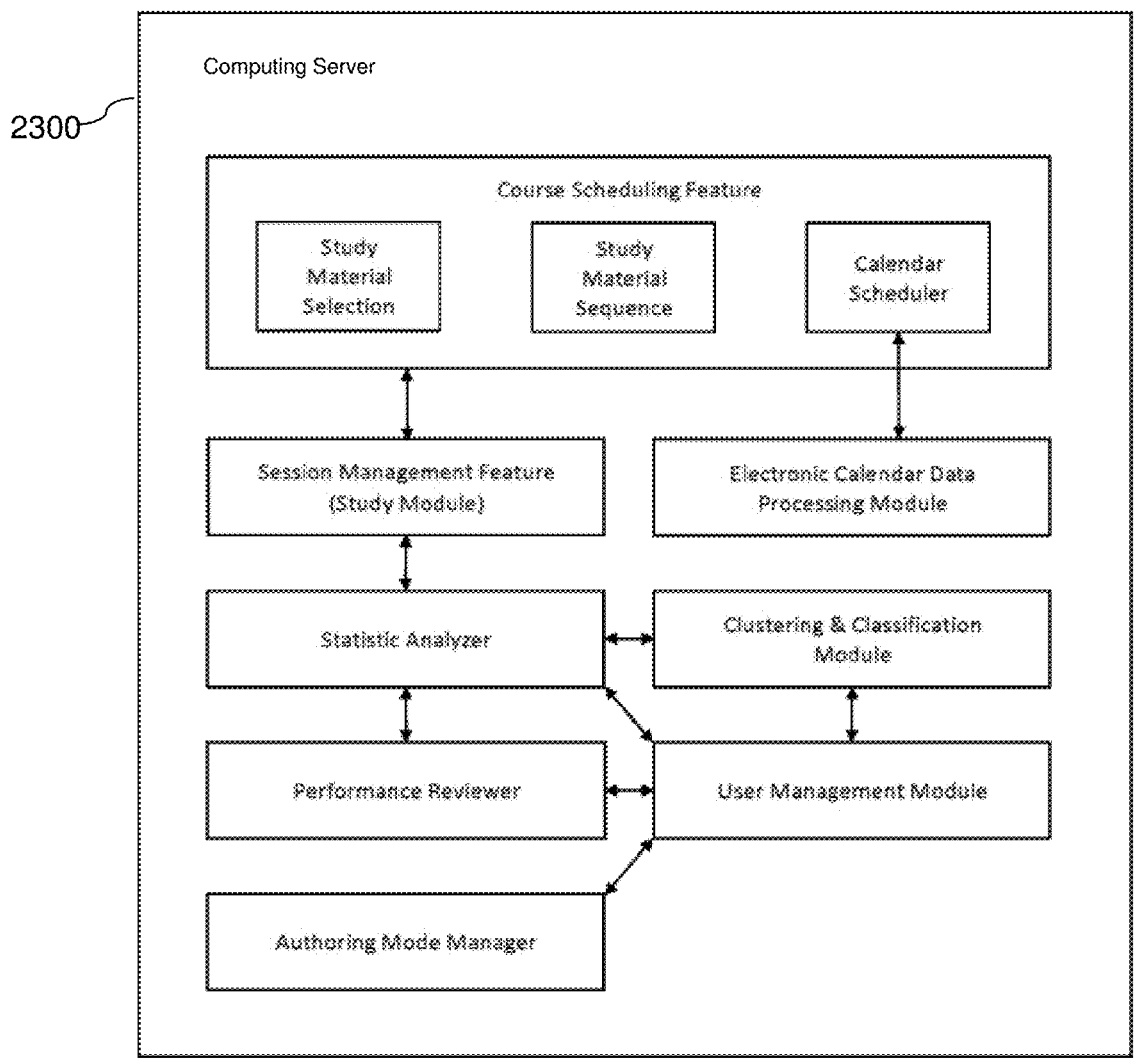
FIG. 3 is one embodiment of a computing server.

FIG. 3 is one embodiment of the computing server 2300. As shown in FIG. 3, the computing server 2300 (which may represent one of several computing servers within a computing server farm) may be configured to perform a wide range of functions for implementation of the study system. For instance, the computing server 2300 may include a course scheduling feature component through which the computing server 2300 selects study material for a study course, generates a schedule for administering study sessions of the study course, and generates a sequence of the selected study material, of each which is described in greater detail below. As further described in detail hereinbelow, the computing server 2300 may include additional modules interworking with one another, such as, for example, a session management feature (i.e., study module), a statistics analyzer, a performance reviewer, an authoring mode manager, an electronic calendar data processing module, a clustering and classification module, a user management module, and so forth, to enable additional functionality for implementing the study system described herein.

Embodiments of the present invention will now be described in detail with specific reference to virtual flash cards. It should be noted, however, that the invention is not limited thereto. Rather, techniques described herein are equally applicable to other varieties of study material, such as a quiz or examination containing questions (e.g., fill-in-the-blank questions, multiple-choice questions, true-false questions, free-form or essay questions, etc.) to be answered by a user, association or matching tasks, drawing challenges (a user's drawings can be matched to a "correct drawing" using image or stroke recognition algorithms known in the art), and so forth. For instance, the techniques described herein for intelligently selecting virtual flash cards may be implemented in the same or substantially similar manner for intelligently selecting questions within a quiz. Therefore, although the present invention is described hereinbelow with specific reference to virtual flash cards for the purpose of demonstration, the virtual flash cards represent but a single example of study material among several possible types of study material, such as those listed above or other types of study material which could be envisioned by a person possessing an ordinary level of skill in the art.

Figure 6:
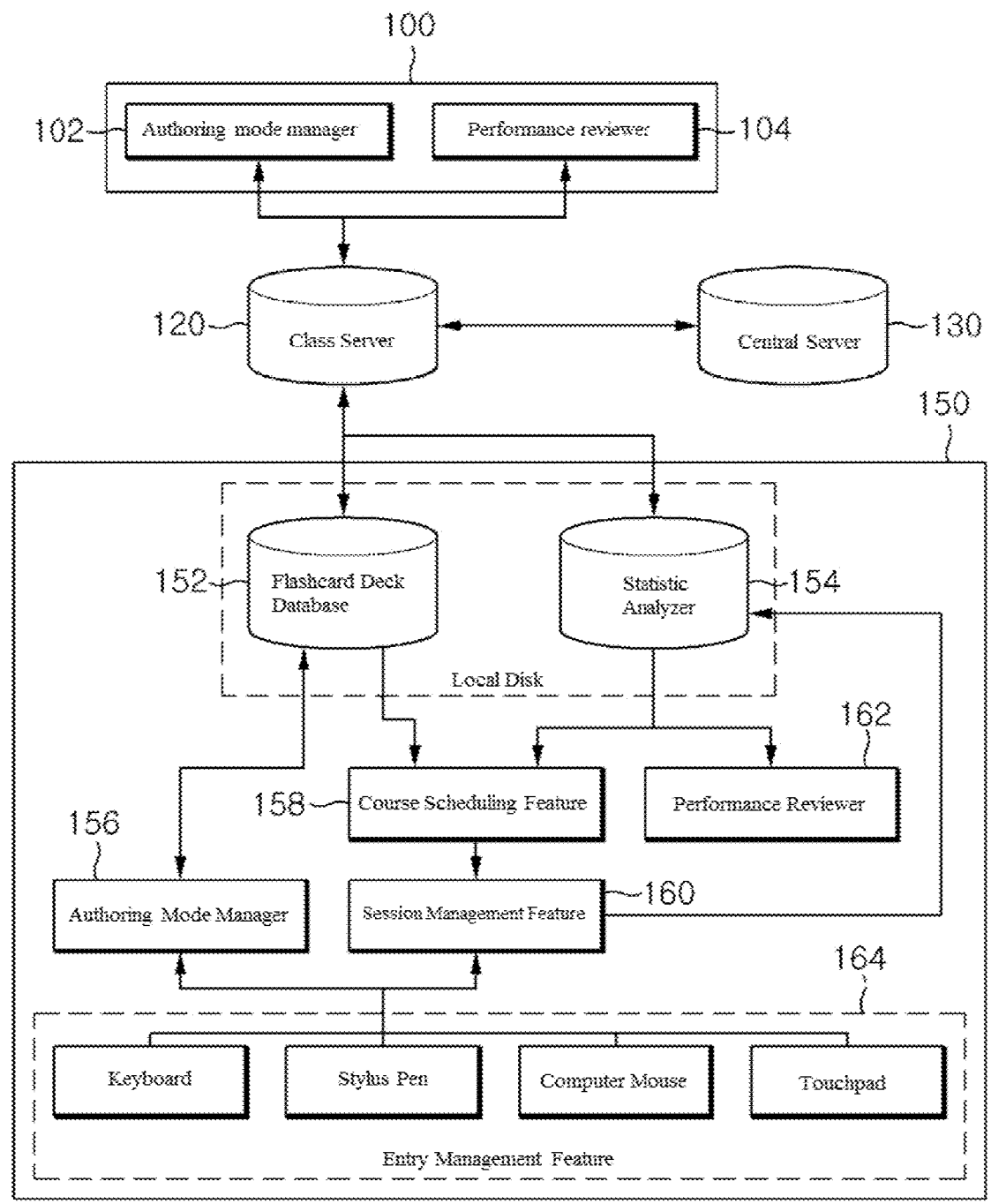
FIG. 6 is one embodiment of a block diagram of a studying system using virtual cards.

FIG. 6 is one embodiment of a block diagram of a studying system using virtual cards.

The present invention comprises a client training feature 150, a client management feature 100, a class server 120, and a central server 130.

FIG. 6 provides an overview of a studying system using virtual card activated in classroom setting.

The client training feature 150 interacts with the users. The primary function of the client training feature 150 is to help users study virtual cards.

Virtual cards are not physical cards with actual sides or surfaces but are computer based cards. The computer based virtual cards can be utilized as flash cards by reproducing the design of the actual flash cards.

The front and back side of a virtual flash card may be comprised of text, one or more images, or multimedia data types.

The front side of a virtual flash card may bear a question and the back side may comprise a corresponding answer.

For example, if the front side of a virtual flash card displays a vocabulary word, the back side of such virtual flash card can display the corresponding meaning.

On the other hand, if the front side of a virtual flash card displays a mathematical problem, the back side of such virtual flash card can display the corresponding solution.

In certain cases, a virtual flash card may also include a hint associated with the content on the front and back side of the virtual flash card.

The client training feature 150 comprises a session management feature 160, a flash card deck database 152, a statistic analyzer 154, a course scheduling feature 158, a performance reviewer 162, an entry management feature 164, and an authoring mode manager 156.

The session management feature 160 administers the study sessions of student users. During the study sessions, the client training feature 150 displays series of virtual flash cards from the corresponding virtual flash card deck.

The studying method utilizing virtual flash card is administered through study courses. Study courses comprise a plurality of study sessions and virtual flash card decks associated with the course topic. A study course may be formulated by initially identifying the best learning sequence or permutation for a given user based on the user's history (e.g., using results from a diagnostic test), as well as the history of other users, and also the likelihood of the given user mastering the study material.

The learning sequence for the course material may be determined in various ways. For example, databases and/or servers can store all learning sequences presented to users as well as the learning progress for specific sequences. In this regard, FIG. 4 illustrates a table mapping learning sequences against user IDs and user performance scores. The highest scoring sequence (i.e., performance index) can be sorted for a particular learning topic for a given user as well as all users. The highest scoring sequence can be updated as the users continue their respective study programs. Then, the highest scoring sequence can be used for the next study session.

Accordingly, identifying the highest scoring sequence can be leveraged to enhance a user's learning capabilities. For example, if a user struggled with study materials presented in an order of a, b, c, it may be identified that the user demonstrates an improved learning ability with the study materials rearranged as c, b, a. In this case, c, b, a represents the highest scoring sequence. Similarly, if a user struggles with learning English vocabulary, it may be identified that the user demonstrates an improved learning ability if the Latin root is presented before English vocabulary. In this case, presenting Latin vocabulary prior to English vocabulary represents the highest scoring sequence.

The study sessions can be determined accordingly to the user's study objectives and the user's available time to study. For example, if the user's study objective is to master SAT Verbal course within three months and if the user is available to study once a week, the system will sort corresponding virtual flash cards into twelve groups and customize study sessions for each of such groups.

The study sessions can be customized differently depending on the user's progression throughout the course. For example, after each study session is completed, the system analyzes the user's progress to arrange or rearrange the next study session. The amount of material to be mastered in the subsequent sessions may increase or decrease depending on how close the user is from achieving his or her study objective.

Before a particular study session starts, the system can suggest session goals to the user depending on the user's studying situation, or the user can input his or her own study course or study session goal manually.

For example, the course objective and the session goal could be "90% on SAT Verbal" and "memorizing 20 vocabulary words per day," respectively. The course objective is determined by the user whereas the session goal may either be customized by the user or the user may choose from the session goals that the system recommends to him or her.

When the user manually inputs his or her goal, the system may utilize language processing techniques to translate the user's text string into a numerical target. For instance, if a user inputs "get an A on English vocab test," the system can look for text within the inputted string and compare the text to a pre-populated database that maps text to a numerical value or range of values. As an example, the database could contain entries for letter grades 'A', 'B', and 'C' corresponding to {90-100}, {80-89}, and {70-79}, respectively. Thus, the system could identify the presence of 'A' within the user's string and determine that the user's target range of scores is 90%-100%. The system can also suggest to the user the possible match for the letter grades 'A', such as ranges {90-100}, {92-100}, {93-100}, etc., based on the ranges that other users have associated with the letter grades in the past, as shown below in Table 1. If no match exists within the database, however, or in the event that the system-found range is different than the user's actual desired range, the user can insert a custom number or a range of numbers into the database, and a new entry in the database may be created.

TABLE 1

| Goal Text | Numerical Range |
| --- | --- |
| 'A' | {90-100} |
| 'A' | {93-100} |
| 'A' | {92-100} |
| 'B' | {80-89} |
| 'A' | {89-100} |

In certain situations, e.g., five minutes before an exam, a study session containing virtual flash cards that the user is already familiar with is more appropriate for the user to review than a study session containing virtual flash cards that are new to the user or would take him or her longer than five minutes to learn.

In such cases, the user can customize his or her session goal as "five-minute review before the examination," and the system may consider the following factors to select virtual flash cards for review: (1) the rate and percentage of correct answers given by the user for each of such virtual flash cards; (2) the rate and percentage of correct answers given by other users for each of such virtual flash cards; (3) time needed for such user to complete each of such virtual flash cards; (4) time needed for such other users to complete each of such virtual flash cards; and (5) the changing pattern of the rates and percentages of correct answers provided by the user and/or other users for each such virtual flash card when the user and/or other users answered each virtual flash card for more than once throughout the study session and/or the study course.

When calculating the percentage of correct answers provided by the user for each of such virtual flash cards, the system considers if the user has reviewed or answered the virtual flash card. If a virtual flash card was never reviewed or answered by the user, the system automatically sets the value of such virtual flash card with a predetermined default value. The predetermined value may be 0%, 100%, or other values.

For instance, in the case of five minutes before an exam, it is more efficient for the user to review the problems that he or she answered correctly 70-80% of the time than to review the problems that the user almost never answered correctly or almost always answered correctly. It would also be meaningless for the user to review a problem that normally took him or her more than five minutes to answer. Thus, in such cases, the system may select the virtual flash cards the user normally answered within 30 seconds and answered correctly 70-80% of the time. Furthermore, it may be more beneficial for the user to review the flash cards that the user answered correctly 4 out of 5 times, rather than 40 out of 50 times. Hence the invention not only measures the percentages of the correct answers for each flash card, but also the rates of the correct answers by keeping track of the number of times each flash card was presented to the user.

The study sessions may contain different virtual flash card decks depending on the users' studying situations. Since each user's information (i.e., the rate and percentage of correct answers provided and time took to answer the problem) is registered in each virtual flash card, different virtual flash cards may be provided to different users even if they are registered for the same study course and share same study objectives.

The user is prompted to enter an answer for each virtual flash card. When a user submits an answer, the system can either automatically check if the submitted answer is correct or allow the user to manually check his or her answer.

When running an automatic check, the system scores the answers by comparing the user's entry to the answer in the system's database. If the entry is in form of text or image, the system utilizes character recognition techniques to translate the entry. If the translated entry matches the answer in the database, the system scores the entry as a correct answer.

If the user wishes to manually check and score his or her answer, the system can display the back side of the virtual flash card so the user can compare his or her answer to the answer provided by the system.

The invention's study system keeps track of the user's (student) performance, his or her objectives, time constraints and other information including those of other users.

The information above are saved in the statistic analyzer 154.

The "study course" comprises the virtual flash card decks, users' study goals or objectives, time constraints, and performance statistics.

In essence, a "study course" comprises a collection of virtual flash cards assembled for a specific study goal (e.g., 95% proficiency in 8th grade math) and a particular virtual flash card deck may be assigned to a plurality of study sessions and/or courses.

"Time constraint" is the time it takes the user to master a study course (e.g., two weeks).

The user's progress or performance can be interpreted as "proficiency." Here, "proficiency" is the percentage of correct answers provided by the user for every virtual flash cards contained in a study course. The value of the user's progress is calculated by taking the number of flash cards answered correctly by the user above a certain percentage, divided by the total number of flash cards assigned to achieve the study objective, multiplied by one hundred (100). The percentage of correct answers for virtual flash cards reviewed less than a certain number of times can be set as zero (0) depending on the learning situation.

The value of the user's progress and the virtual flash card decks associated with study courses are saved in the local disk by the statistic analyzer 154 and/or the virtual flash card deck database 152.

The course scheduling feature 158 divides a study course into a plurality of study sessions and assigns the study sessions accordingly to the user's progress or availability. The course scheduling feature 158 further assigns the virtual flash cards to specific study sessions and the order of virtual flash cards being displayed.

The course scheduling feature 158 schedules the study course accordingly to the user's progress and the change in user's availability. The user's availability may be determined through user input or by other means such as retrieving the user's electronic calendar data (e.g., Outlook, Google Calendar, Apple Calendar, etc.). In the latter case, the system may identify open time slots in the user's calendar and schedule study sessions accordingly. The system may request permission from the user to access third-party calendar information and, if permitted, request the user's login information.

The user can be presented with a calendar view through the user interface on the user terminal 2200 showing all of the user's appointments from the electronic calendar data, as well as all scheduled study sessions. After study sessions have been scheduled, the user can view the calendar and manually accept or rearrange the scheduled sessions as desired. The user may, for example, block-out certain dates or times or, alternatively, indicate certain dates or times as optimal for scheduling study sessions.

The system may take additional steps to dynamically schedule study sessions and/or prevent conflicts with previously scheduled study sessions. For instance, as the user's schedule changes, if the system has been granted permission to access the user's electronic calendar data, the scheduling of upcoming study sessions can be adjusted accordingly. Furthermore, in the event that an upcoming study session has been scheduled, and a user receives a calendar invitation to a given event that conflicts with the upcoming study session, the system may notify the user that the invitation, if accepted, would conflict with a scheduled study session. The system could also notify the user that a certain number of study hours would be forfeited should the user accept the invitation, or could notify the user that the likelihood of achieving the user's goal may decrease by a particular percentage as a result of accepting the invitation, as a way to encourage the user to prioritize studying.

The likelihood of achieving the user's goal, as referenced above, may be calculated in various ways. For example, the system can calculate the user's learning pattern (e.g., upward slope, downward slope, fluctuating pattern, etc.) for each individual study question or flash card. Then, for all study questions or flash cards within a particular study topic (e.g., all 1000 vocabulary terms for "SAT verbal" topic), the algorithm can find the best fitting curve (e.g., by performing nonlinear regression) by mapping time (x-axis) against learning performance (y-axis). Based on the trajectory, the system can predict when the user will reach his or her learning goal.

Similarly, if a user's study time is reduced by a period of time as a result of accepting an invitation, as described above, the system may calculate how short the user would be from reaching his or her goal. For example, Bayesian linear regression can be used to calculate the amount of lost study time when the learning progress is more or less linear, or polynomial regression when the progress is nonlinear.

The system can provide additional notifications ("smart notifications") to the user throughout the study course to keep the user apprised of ongoing developments in the course. For instance, the user can be notified of an upcoming study session shortly prior to the study session. Also, the user may be notified when the study algorithm has been updated due to new data from other users' study courses that impacts the user's own study course. A new most favorable learning sequence can be discovered after evaluating the performance of other users. For instance, if study material has been presented in an order of a, b, c, but an evaluation of 1,000 users indicates that learning ability can be improved by rearranging the study materials as c, b, a, the system can identify c, b, a as the new most favorable learning sequence (i.e., the arrangement of study materials presented to the user that maximizes the user's learning ability).

Furthermore, the user can be notified when other users studying the same material have reached a particular milestone. The purpose of such a notification is to encourage the user to attempt to reach the same milestone in his or her own study course. In further detail, the user may indicate a certain group of other users as "friends," and can receive updates on the friends' study progress. The user can also be notified that the user's study schedule has been automatically updated, and may prompt the user to indicate whether the change is acceptable.

The system can also allow the user to designate particular other users for the purpose of benchmarking the user's performance against that of the other users. For instance, the user could designate or the system may suggest the top 5th percentile learners for a given subject. Also, the user could designate or the system may suggest "similar users" having similar demographics, e.g., age, location, educational level, etc., based on the users' stored profile data. Also, the user could choose his or her friends by tagging specific users as "friends."

Prior to benchmarking, the system may establish a baseline for the user, either by taking a diagnostic test or by importing the user's grades from an external source. The user's current learning level can also be determined by comparing the learning data of other users. The percentile in which the user belongs among all users may then be calculated (e.g., an average learner, a top 5th percentile learner, etc.).

Various techniques can be employed to determine favorable learning patterns for the user when comparing the user's learning data to that of other users. In one example, machine learning and neural networks can be used to identify the most favorable learning sequence for a user (i.e., the learning sequence (or arrangement of study materials) presented to the user which maximizes the user's learning potential). In this regard, various pieces of data illustrated in FIG. 4, such as learning sequences $\{X1, X2, \ldots Xn\}$ and performance scores $\{S1, S2, \ldots Sn\}$, as well as the time taken to correctly answer a question $\{T1, T2, \ldots Tn\}$, demographic information (e.g., age, ethnicity, location, grade level, gender, etc.), contextual factors (e.g., time remaining until the goal "due date," time spent studying, user's location, number of past courses the user has completed, number of topics the user is currently learning, etc.), and the like, can be used as input nodes to a machine learning algorithm. Weights can be assigned to each factor according to the relative importance of said factors. Thorough backward propagation, the system may learn the appropriate weights for the various factors ("hidden layers").

After training the machine learning algorithm with a sufficient amount of data (and weighted data), and the algorithm can output a favorable learning sequence (i.e., output node) for the user. Notably, the training data can consist of the existing learning performance data of the user as well as that of other users.

In the event that significant variance exists between the users and other similarly situated users, the system may request the user for additional background information. For instance, geographical or linguistic backgrounds can greatly affect a user's comprehension in particular subjects. Thus, identifying a user's idiosyncratic background and inputting updated information into the neural network can help to determine the favorable learning sequence. An effective study sequence may then be developed following the favorable learning sequence.

Additionally, the system can mine the user's calendar data to determine the nature of certain appointments, and schedule study sessions based on such information. For example, the user's calendar data can be evaluated to determine whether a user at a given time is busy (e.g., attending a mandatory meeting), tentatively busy (e.g., attending an optional meeting), or available. If the available time is greater than the amount of time needed to achieve the user's goal, e.g., master the study material, then the course scheduling feature 158 can exclusively use "available" time slots to schedule study sessions. If, on the other hand, the available time is less than the amount of time needed to achieve the user's goal, then the course scheduling feature 158 might use "available" and "tentatively busy" time slots to schedule study sessions, or take other actions such as notifying the user that the available time is insufficient to achieve the user's goal, suggesting that the user re-schedule or cancel certain appointments, and so forth.

The course scheduling feature 158 can optimize the study schedule over multiple courses or learning topics. In this regard, throughout each study course, the course scheduling feature 158 tracks metadata identifying, at least, the user's goal, the goal due date (e.g., date of an examination), and the number of study hours required to achieve the goal as calculated and/or predicted by the course scheduling feature 158 (based on the user's learning coefficient, if available). Then, as the user studies and progresses toward achieving the goal, the course scheduling feature 158 may dynamically recalculate the course schedule for future study sessions.

In cases where the user is involved in multiple study courses, e.g., preparing for a multi-subject examination, preparing for multiple examinations, etc., the course scheduling feature 158 can optimize the user's study schedule by prioritizing the various study courses. For instance, the study course with the earliest due date may receive top scheduling priority, the study course with the second earliest due date may receive second scheduling priority, and so on. Alternatively, the user can manually indicate a priority ranking of each study course, and the course scheduling feature 158 can schedule the study courses based on the user's rankings. A user could, for instance, indicate that studying for an English examination receives top priority, studying for a Spanish examination receives second priority, and so forth. Alternatively, the course scheduling feature 158 may automatically assign top priority to a study course in which the user is struggling the most, while assigning the lowest priority to a study course in which the user is succeeding the most. Even further, the course scheduling feature 158 can optimize the user's study schedule according to the expected average score for each course (e.g., the course with the lowest expected average score is prioritized so as to maximize the amount of time spent studying on such course). An expectation maximization algorithm can be used to determine the expected average scores for all courses.

Figure 5A:
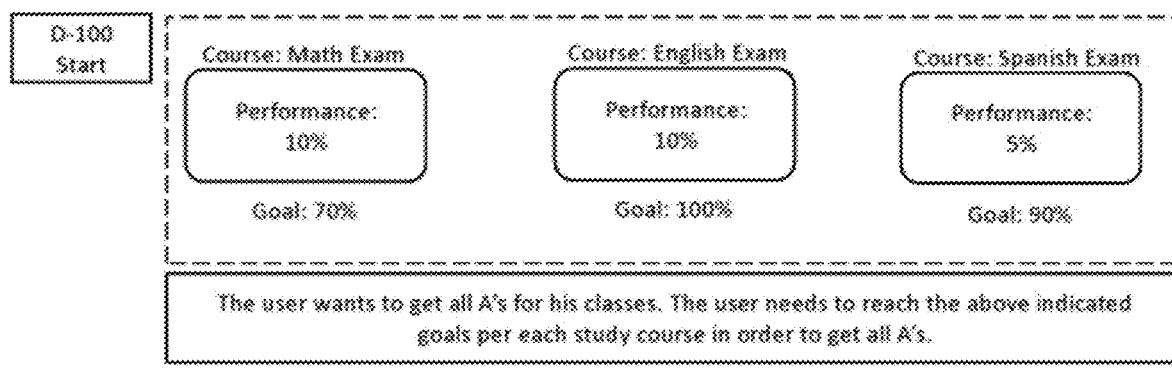
FIGS. 5A-5D illustrate an example a multi-subject study course.

For instance, FIGS. 5A-5D illustrate an example a multi-subject study course including a math examination, English examination, and Spanish examination. In each class (math, English, and Spanish), the user wishes to obtain an 'A', and thus the user sets the necessary percentage to achieve straight A's as the goal for each course: 70% on the math examination, 100% on the English examination, and 90% on the Spanish examination. As shown in FIG. 5A, the user's baseline performance, as referenced above, is 10%, 10%, and 5% in math, English, and Spanish, respectively.

Figure 5B:
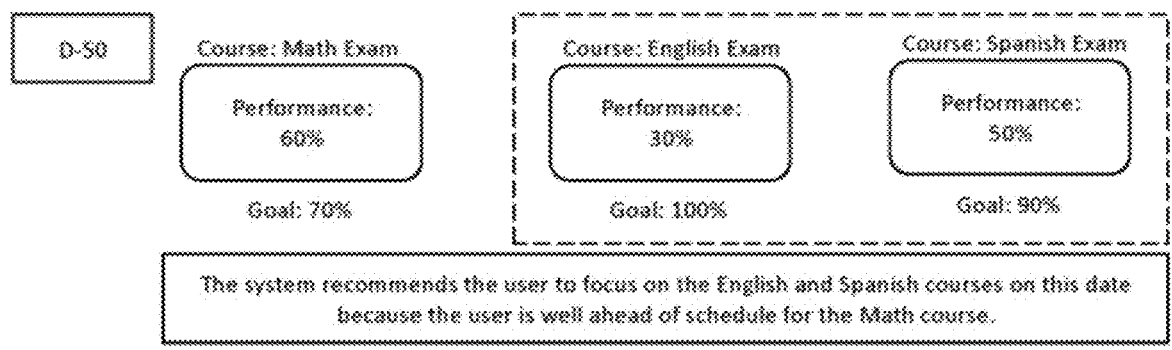
Figure 5C:
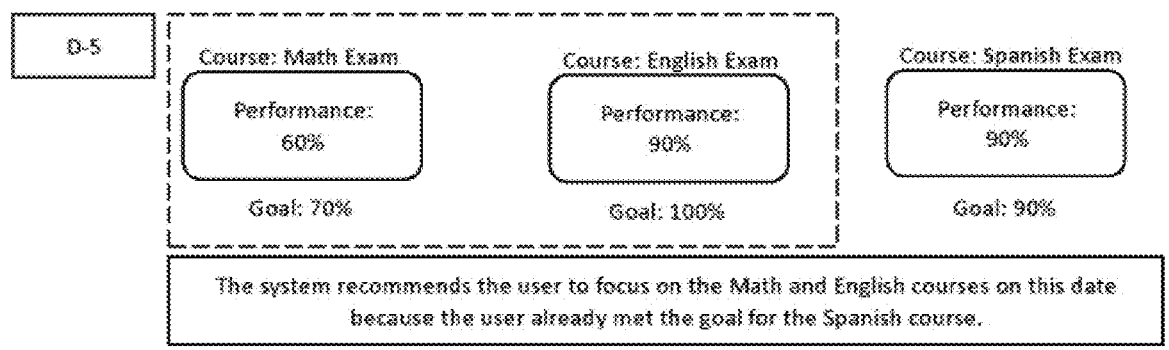
Figure 5D:
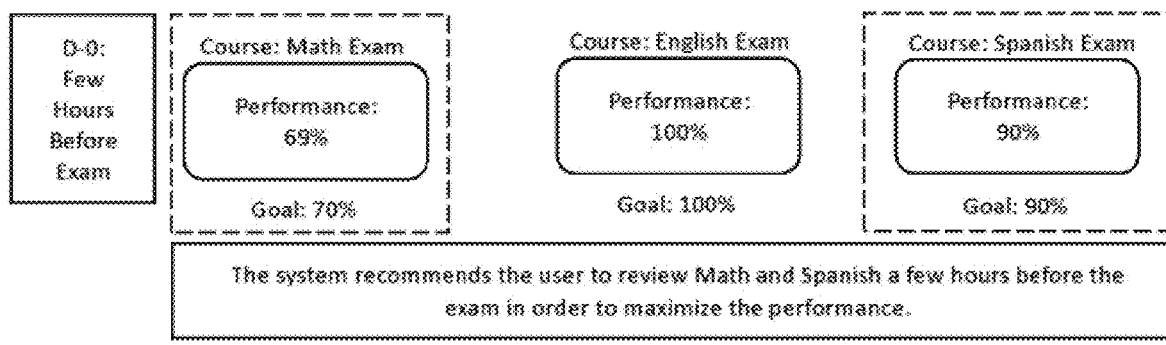

As the study courses progress (i.e., from FIG. 5A to FIG. 5D), the user's baseline performance increases, ideally reaching the goal percentage in each subject at the completion of the courses. As shown in FIG. 5B (50% completion), the system may recommend to the user to focus on studying for English and Spanish, as the user's performance in English and Spanish greatly trails the user's performance in math. As shown in FIG. 5C (95% completion), the system may recommend to the user to focus on studying for math and English, as the user's performance has already reached the target level in Spanish at this time. Finally, as shown in FIG. 5D (hours before the examinations), the system may recommend to the user to focus on studying for math and Spanish, as the user's performance in English has already reached at 100%, and the user may not have reviewed Spanish in the last few days since the user already had reached the goal for Spanish five days prior.

In other cases, such as five minutes before the exam, the course scheduling feature 158 can consider the above factors when determining the order of the virtual flash cards.

When the user has a limited amount of time to review the materials, it would be beneficial for the user to review the material that would maximize his or her learning benefits by considering the changing pattern of the rates and percentages of correct answers given by the user and/or other users for each virtual flash card, and time constraints when determining which virtual flash cards to review during the remaining time.

In a situation where the user has five minutes left to review for an exam, it would be unsuitable for the user to review a problem he or she never answered correctly or a problem that normally took the user an hour to answer. The more useful studying method in this situation could be reviewing the virtual flash cards with the most recent answering rate being near 70% or more; and to review the cards with the shorter time needed to answer before reviewing the ones that require longer amount of time, as to maximize the amount of the reviewed material before the exam.

Thus, the course scheduling feature 158 considers the following factors when assigning the virtual flash card to a particular session and determining the order of virtual flash cards: (1) the rate and percentage of correct answers given by the user for each of such virtual flash cards; (2) the rate and percentage of correct answers given by other users for each of such virtual flash cards; (3) time needed for such user to complete each of such virtual flash cards; (4) time needed for such other users' to complete each of such virtual flash cards; and (5) the changing pattern of the rates and percentages of correct answers provided by the user and/or other users for each such virtual flash card when the user and for other users have answered each such virtual flash card for more than once throughout the study session and/or the study course.

The course scheduling feature 158 may receive information such as other users' progress, rate and percentage of correct answers for each such virtual flash card, and changing pattern of the rates and percentages of correct answers for each such virtual flash card through the class server 120 and the central server 130, and schedule the course accordingly. In other words, the feature not only considers the user's progress, rate and percentage of correct answers, and changing pattern of the rates and percentages of correct answers, but also other users' progress, percentage of correct answers, and changing pattern of the percentages of correct answers to produce optimal results. Here, the feature may consider only the information of the users in same grade or level as such user.

For example, the system may display the virtual flash cards with the greatest disparity in such user's and other users' rate and percentage of answering correctly. The system may also display the virtual flash cards other users reviewed the most.

If the system does not have enough information on such user yet, the course scheduling feature 158 may determine the order of the virtual flash cards by utilizing the information of other users in the same or similar grade or level as such user.

As described above, the course scheduling feature 158 can utilize other users' learning statistics to schedule such user's study session and select the virtual flash cards.

In certain embodiments, the course scheduling feature 158 may not necessarily consider the user's availability.

In certain embodiments, the course scheduling feature 158 may provide an estimated time to complete a course to achieve the learning goal of the user. The estimated time to complete may differ depending on the user's proficiency, studying situation, and etc., and it may be dynamically re-calculated based on the user's progress. By providing the estimated time to complete, the feature allows the user to practice answering a problem within a certain time range.

Additionally, the course scheduling feature 158 may schedule the study course after an optimal learning sequence has been determined based on highest scoring sequence, which can be ascertained by administering a diagnostic test. For instance, if the user is a Spanish speaking user, for this particular user a more favorable learning sequence to learn English vocabulary could be reviewing a Spanish word first followed by the corresponding English word, rather than reviewing a Latin word first and then the corresponding English word for another user who studied Latin in the past. Further, the diagnostic test may be utilized to identify a given user's performance percentile, e.g., the user may be amongst the 95th percentile or the bottom 10th percentile.

Based on the above information, it can be determined how long a given user might take to achieve his or her learning goal. For example, the amount of time a given user might take to achieve his or her learning goal can be calculated by determining the number of minutes ($t\_1, t\_2, t\_3 \ldots t\_n$) needed to solve each problem 1 through N based on previous learning progress data for this user (e.g., from the initial diagnostic test or subsequent learning progress data). The amount of time may be compared to the average time taken to solve the problems amongst other users with similar learning goals. If no previous data for other users with similar goals exists, then a given dataset can be interpolated to produce a "coefficient" to account for this user's idiosyncratic behavior. As an example, if an average user takes 100 hours to achieve a desired goal (e.g., achieve an 'A' on an upcoming exam, master a certain subject, etc.), and a particular user's coefficient is 1.2, it can be predicted that the particular user will take 120 hours to achieve the goal. Conversely, if the particular user's coefficient is 0.8, then it can be predicted that the user will take only 80 hours to achieve the goal.

The course scheduling feature 158 may consider the user's situation when selecting and determining the order of virtual flash cards in a particular study session.

In one example, study material can be sorted dynamically in an order that fits the user's current situation at the beginning of each study session. As such, the learning sequence can change dynamically each study session as the user's situation changes. A learning sequence may even be updated within a given study session, i.e., as the user studies.

Because the user's information is registered for each virtual flash card (such as proficiency and estimated time required to answer the problem), the selection and order of virtual flash cards may differ depending on the user even if the study course and objectives are identical among the users.

The selection and order of virtual flash cards may also differ depending on how the changing pattern of the rates and percentages of correct answers given by the user and/or other users for each of such virtual flash cards is. The changing pattern of the rates and percentages may capture one of the increasing, decreasing or fluctuating trends of the percentages of correct answers for each virtual flash card. For example, in the case of five minutes before examination, among virtual flash cards with the percentage range of correct answers from 60% to 70%, a virtual flash card having a decreasing trend of the percentages of correct answers may be displayed earlier than a flash card having an increasing trend of the percentages of correct answers. Conversely, if a user is studying months before the examination, study material that was most frequently missed or never understood well can be selected to improve the user's comprehension of such subject matter.

In cases where the rates and percentages of correct answers provided by the user for virtual flash cards are equal, the selection and order of such virtual flash cards may be determined based on whether the changing pattern of the rates and percentages of correct answers given by the user and/or other users for each of such virtual flash cards captures the increasing trend of the percentages of correct answers, the decreasing trend of the percentages or the fluctuating trend of the percentages. For an example, there may be two flash cards where the changing pattern of the rates and percentages of correct answers by one user differs but the rate and percentage of correct answers is the same. This may occur where, in the case of answering two flash cards for four times throughout a study session and/or a study course, the user answered one virtual flash card incorrectly the first time and correctly the last three times and answered another virtual flash card correctly the first three times and incorrectly the last time. So far, both flash cards have the correctly answered rate of 75% for the user. However, the former card is in an increasing trend of the rates and percentages of correct answers, while the latter card is in a decreasing trend of the rates and percentages of correct answers. Such phenomena could be caused in a certain case where, as time passes by, the user may forget the learned material, or newly learned materials may negatively impact the users' the retrieval of the previously learned material. In this case, the selection and order of such two cards are determined depending on the goal of the study session and the course, and the learning situations of the user.

The performance reviewer 162 calculates the progress of the study course or session and presents the calculated result to the user in different ways.

Such calculated progress is analyzed and saved by the statistic analyzer 154.

The authoring mode manager 156 allows the user to create his or her own virtual flash card decks.

In other words, the user can: (1) create new cards; (2) modify existing cards; (3) delete a card; (4) merge card decks; (5) organize or label the cards and decks; and (5) import and export flash cards from the class server 120 and the central server 130.

The client training feature 150 can receive and perform the user's entry through the entry management feature 164.

The entry management feature 164 may receive the user's entry through a keyboard, computer mouse, touch pad, tablet pen, or stylus pen (touch pen).

The entry management feature 164 can run at all times regardless of whether the system is in authoring mode or training mode.

The client management feature 100 comprises an authoring mode manager 102 and a performance reviewer 104. The client management feature 100 controls the class server 120.

The class server 120 saves the common virtual flash card decks, simplify the distribution of virtual flash card decks, gather information on users' progress, and help users utilize the studying system.

The client management feature 100 is a feature created for users who are teachers and exam proctors. The client management feature 100, through the authoring mode manager 102, allows such users to edit the virtual flash card decks saved in the class server.

The authoring mode manager 102 is similar to the authoring mode manager 156 of the client training feature 150, but unlike the authoring mode manager 156, the authoring mode manager 102 does not administer the local deck which is a set of flash cards that are being used in the current study session which is a subset of the entire flash card decks in the current study course selected by an user.

In certain embodiments, the authoring mode manager 102 may provide the name of the user who created or edited a particular virtual flash card.

The performance reviewer 104 provides teachers and exam proctors with progress reports of students in various formats who attend the class in the class server 120.

The client management feature 100 also includes a function that allows the teachers and exam proctors to transfer study course information and virtual flash card deck information to the client training feature 150.

Although not illustrated on FIG. 6, like the entry management feature 164, the client management feature 100 can include devices that allow users to submit entries.

The client management feature 100 and the client training feature 150 illustrated in FIG. 6 can serve different modes in the system component. In certain embodiments, the components of the client management feature 100 and the client training feature 150 may be different.

The central server 130 is shared through the client management feature 100 and the client training feature 150. The information saved in the central server 130 includes virtual flash card decks, the study course information associated with such virtual flash card decks, and progress reports. The client training feature 150 can either directly select and utilize the virtual flash card decks saved in the central server 130 or utilize the virtual flash card decks recommended by the client management feature 100.

The client management feature 100 can copy and paste the virtual flash card decks saved in the central server 130 to the class server 120. The class server 120 can edit such virtual flash card decks. The proficiency information saved in the central server 130 can be utilized by the course scheduling feature 158 which is included in the client training feature 150.

In certain embodiments, the central server 130 may not exist.

In certain embodiments, the central server 130 may save information on virtual flash card decks only. In such cases, the virtual flash card decks are retrieved from the central server 130. However, the course scheduling feature 158 will not consider other users' proficiency information unless other users are included in the same study course as the user and their proficiency information is saved in the class server 120.

In certain embodiments, class server 120 and client management feature 100 may not be installed in the system. In such cases, the system may or may not include the central server 130.

In certain embodiments, the client training feature 150 may not include a local disk. In such cases, the virtual flash card decks may be saved in the class server 120 and/or in the central server 130. The proficiency information and progress report may or may not be saved in the class server 120 or the central server 130.

Figure 7:
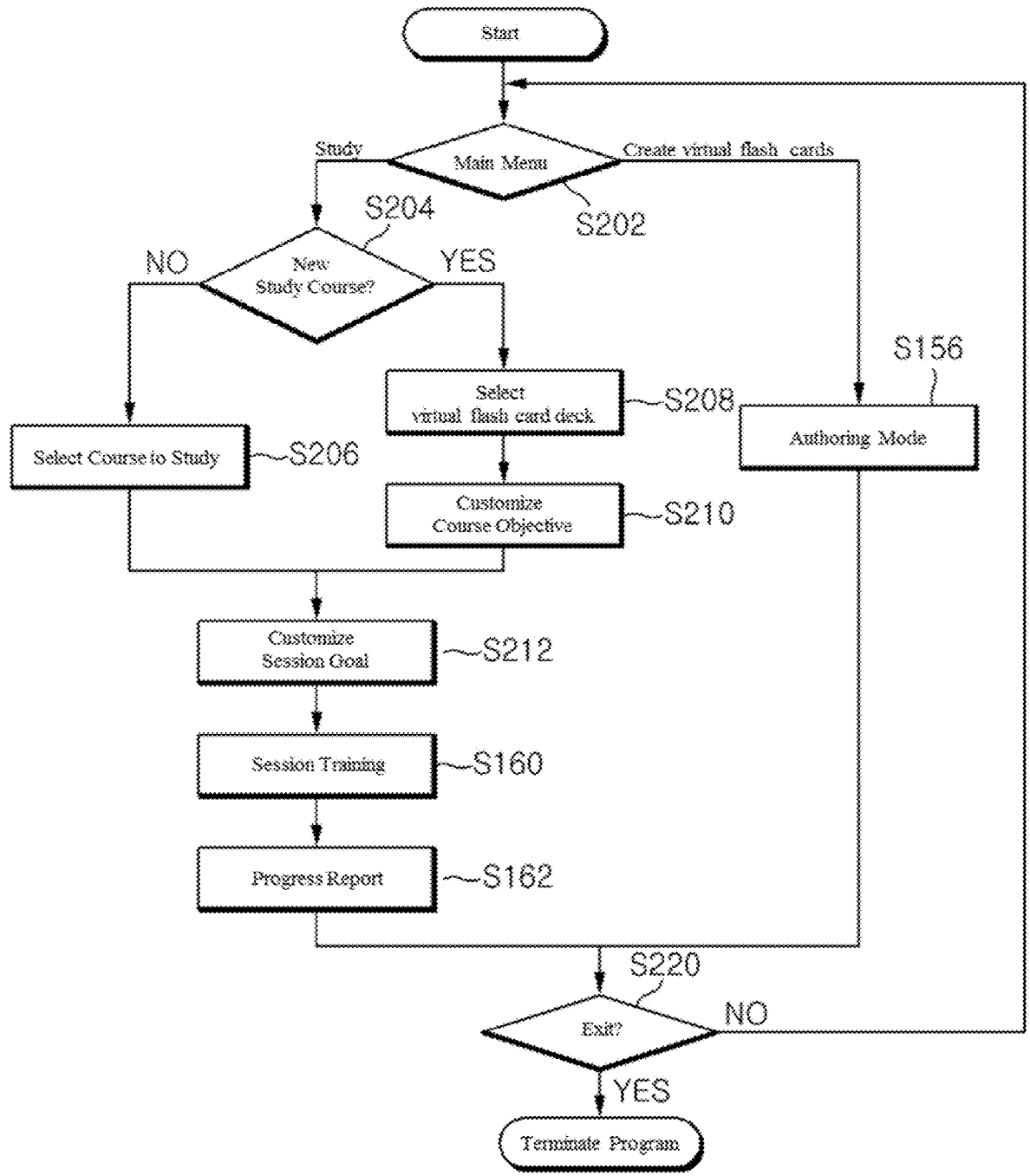
FIG. 7 is a flow diagram illustrating the process of the client training feature in FIG. 6.

FIG. 7 is a flow diagram illustrating the process of the client training feature 150 in FIG. 6.

As illustrated in FIG. 7, upon starting, the client training feature 150 displays the main menu S202 which prompts the user to select either the training mode or the authoring mode.

The user may select the training mode to study a new or existing study course, or the user may select the authoring mode to create/edit the virtual flash cards.

If the user selects the training mode, the client training feature will decide if the user will start a new study course S204 or continue studying an existing study course.

If the user decides to continue studying an existing study course, the client training feature allows the user to select the course to study S206.

If the user decides to start the new study course S204, the client training feature allows the user to select a virtual flash card deck S208 and customize his or her course objective S210.

The client training feature then allows the user to customize his or her goals for the session S212, and performs the session training S160.

When session training is completed, a progress report S162 is provided to the user by the performance reviewer 162.

If the user selects the authoring mode, the client training feature executes the authoring mode and performs all corresponding functions such as creating, editing and deleting virtual flash cards S156.

Upon completion of training or authoring mode, the client training feature displays an exit screen S220. If the user selects exit, the client training feature terminates the system. If the user does not select exit, the client training feature displays the main menu S202.

In certain embodiments, the client training feature can execute the learning mode to allow the user to learn the virtual flash card before starting a study session. In the learning mode, the front and back side of the virtual flash card is displayed to the user and the user may not have to enter the answer.

In certain embodiments, for the purpose of sorting out problematic virtual flash cards, the learning mode may track the time it takes the user to answer a virtual flash card and the frequency of such virtual flash card being displayed.

In certain embodiments, the client training feature may provide the user a full or partial progress report upon completion of each study session.

In certain embodiments, the client management feature 100 may create a study course corresponding to a predetermined course objective without having the client training feature or the user select the virtual flash card decks and course objectives or learning goals. Such study course may then use a default goal setting and be provided to the client training feature.

In certain embodiments, the central server 130 may provide the study course with the associated virtual flash card decks.

During session training S160, the user can enter his or her answer utilizing a stylus pen, tablet, keyboard, etc.

Also, in an authoring mode S156, the user can manually merge virtual flash card decks. Manual merge occurs when the user selects to merge two different virtual flash card decks. The new card deck that is produced by this process consists of all virtual flash cards that were included in such two virtual flash card decks. The client training feature can identify repeating virtual flash cards and delete them. However, the client training feature may not be able to automatically identify and delete all repeating flash cards. In such cases, the user can manually delete the repeating cards in authoring mode and training mode.

Figure 8:
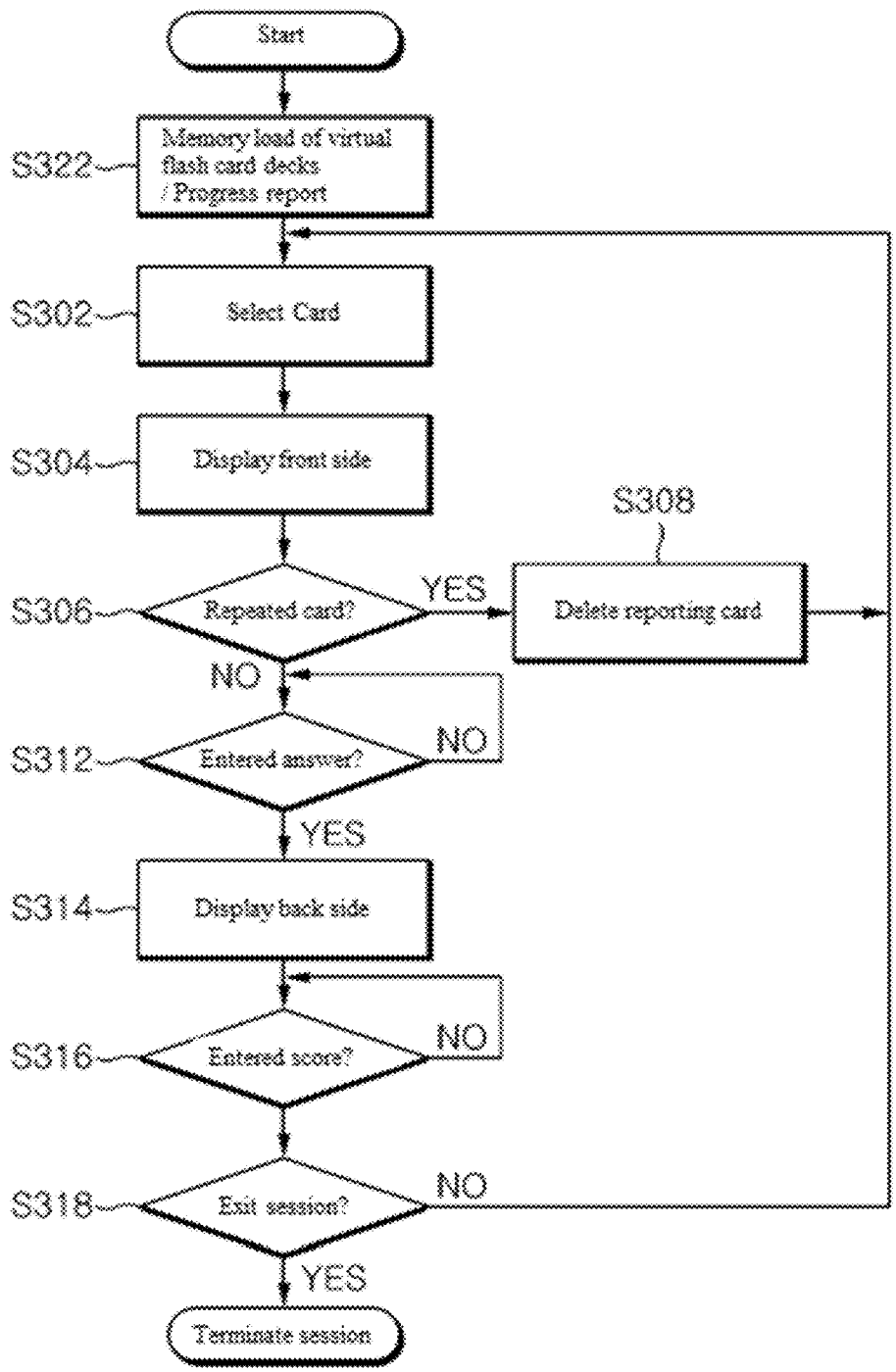
FIG. 8 is a flow diagram illustrating the process of session training in FIG. 7.

FIG. 8 is a flow diagram illustrating the process of session training in FIG. 7.

As shown in FIG. 8, as the session training starts, the virtual flash card decks and progress report that corresponds to the study course is loaded from the local disk S322.

Also, the course scheduling feature, which is included in the client training feature, selects the virtual flash cards from the virtual flash card deck S302.

Here, the course scheduling feature may consider the user's progress statistics, the time required to answer a virtual flash card, and time constraints.

For example, if the exam is in five minutes, the most effective virtual flash card to study would be the one that: (1) does not take long for the user to answer; (2) the user continues to improve from a certain range of time; and (3)

the rate and percentage of correct answers given by the user for such virtual flash card is within a certain range.

When a virtual flash card is selected, the front side of the virtual flash card is displayed S304.

The user can conclude a virtual flash card as a repeated card before letting the system display the next virtual flash card or exiting the session.

Thus, the user can identify repeating virtual flash cards during study sessions S306.

The system may also automatically identify repeating virtual flash cards with its character recognition technique or pattern matching technique.

If determined as a duplicate card, the virtual flash card is deleted from the virtual flash card deck S308 and another virtual flash card is selected to display S302.

If the virtual flash card cannot be concluded as a repeated card, the study session will wait until the user completes the answer or until the time limit to complete the answer expires S312.

In other words, the study session either waits until the user enters an answer or moves to the next step if the user does not enter an answer within the given time.

In certain embodiments, hint may be provided upon the user's request. Here, the hint may be in the form of text, image, video, sound, or content entered in the system's authoring mode.

If a hint is provided, the client training feature tracks the virtual flash cards that provided the hint, and this information is later utilized by the course scheduling feature to determine the selection and order of virtual flash cards.

The client training feature also monitors and saves information on the time it took the user to complete an answer. This information is later utilized by the course scheduling feature to determine the selection and order of virtual flash cards.

The user may skip a displayed virtual flash card during a study session. The user can also remove a virtual flash card from a study session by skipping such virtual flash card. Thus, the user can check the back side of a virtual flash card that he or she wishes to skip and move on to the next virtual flash card.

The system can track information on virtual flash cards that were skipped and provide the information to the user upon request.

Moreover, the user can add new virtual flash cards to the study course or session that the user is studying. The user may create a new virtual flash card through the authoring mode and register such virtual flash card to the associated study course or session.

The user can also exclude a virtual flash card from a study course or session. For example, if a virtual flash card is displayed during a study session and the user determines that such virtual flash card is irrelevant to the examination he or she is preparing for, the user can completely exclude such virtual flash card from the session.

If either the user submits an answer or the given time limit to answer the problem is reached, the back side of the virtual flash card is displayed S314.

The user can score his or her answer manually after comparing his or her answer with the answer on the back side of the virtual flash card.

The system determines whether the user scored the answer S316.

If the user did not enter his or her score, the system waits until the score is entered or until the time given to enter the score expires.

If the user entered his or her score, the system provides this information to the course scheduling feature.

The steps in S316 are eliminated if the system automatically scores the answer. If the system can automatically score the user's answer, either the steps in S314 is eliminated or the back side of more than one virtual flash card can be displayed.

The system determines whether to terminate the study session after each answer is scored S318.

If the study session is not terminated, the system continues to step S302 and selects the next virtual flash card.

If the study session is terminated, the training session halts further performance.

The virtual flash cards can be displayed multiple times during the study session depending on the user's progress. For example, if the session goal is not achieved after displaying all virtual flash cards and there is still time left to complete the session, virtual flash cards that can be answered within the leftover time can be selected and displayed repeatedly.

An updated progress report can be provided to the user upon completion of each study session. In addition, the user can be presented with an indication of where he or she stands in comparison to the population of other users who are studying the same material.

The user entry (input) device includes, but is not limited to stylus pen, keyboard, computer mouse, or other devices to enter the answer of a virtual flash card.

In certain embodiments, the steps S306 and S308 may be eliminated if the merger and/or manual merge function is not supported by the system.

Figure 9:
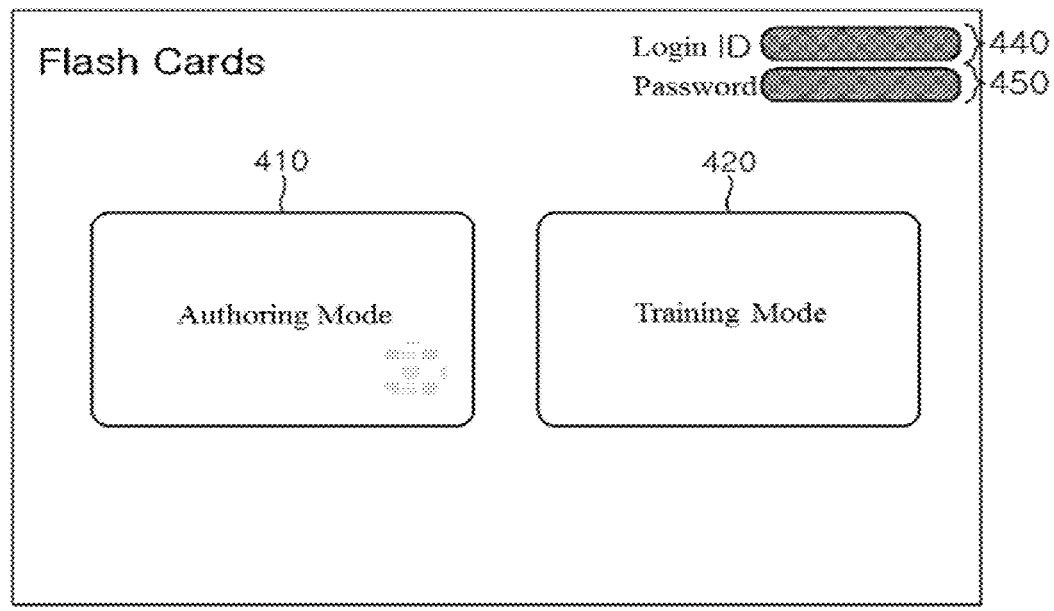
FIG. 9 is an exemplary screen display of the main menu.

FIG. 9 is an exemplary screen display of the main menu.

As illustrated in FIG. 9, upon starting the virtual flash card system, the client training feature displays the main menu. The main menu includes authoring mode menu 140 and the training mode menu 420.

As illustrated in FIG. 9, the user can log-in by typing his or her ID 440 and password 450 at the main menu.

The authoring mode menu 410 allows the user to create his or her own virtual flash card and the training mode menu 420 allows the user to start the studying system using virtual flash cards.

Figure 10:
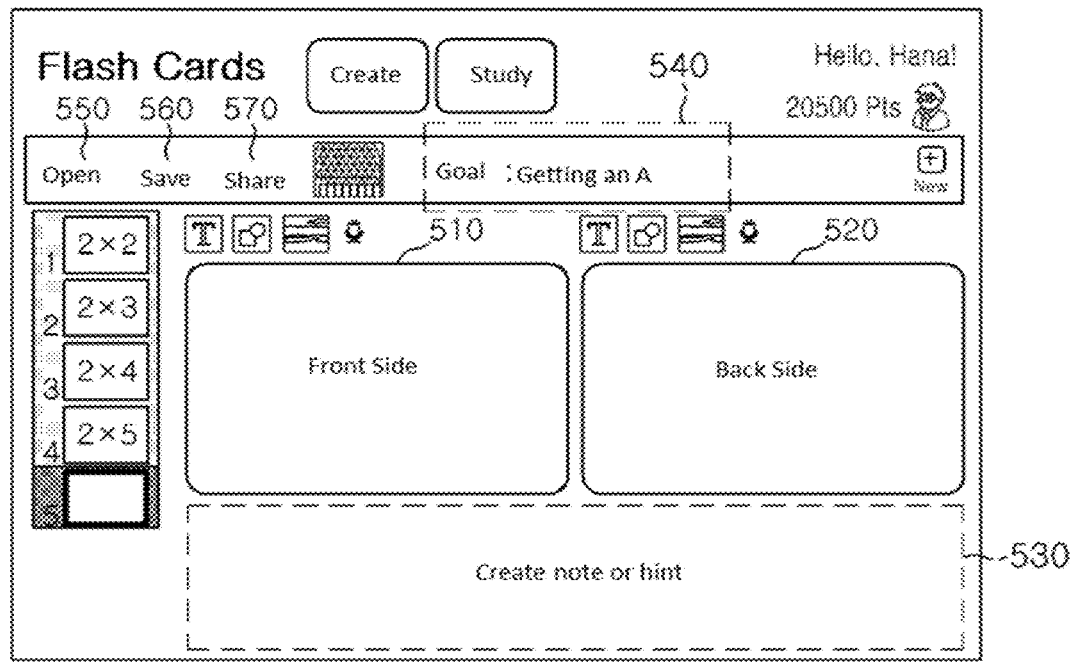
FIG. 10 is an exemplary screen display of the authoring mode.

FIG. 10 is an exemplary screen display of the authoring mode.

As illustrated in FIG. 10, the virtual flash cards are composed of front sides 510 and back sides 520.

If necessary, a virtual flash card may include a hint/note content section 530 that corresponds to the problem on the front side of the virtual flash card.

FIG. 10 is an example of a virtual flash card created to study the two times multiplication table. In this example, the content on the front side of the virtual flash card consists of problems such as "2×2", "2×3", and "2×4", and the content on the back side of the virtual flash card consists of corresponding answers such as "4", "6", and "8".

In addition to displaying the study material via a display screen, an audio version of the content of the study material can be outputted (e.g., via speakers, headphones, etc.), which may be particularly useful for visually impaired users. For example, the system may read a question and/or menu options aloud to the user, and accept sound input (e.g., via a microphone) from the user as an answer to a question or a command. The system may utilize additional types of feedback, such as haptic feedback (e.g., vibrations), raised text to replicate braille, and the like, in order to accommodate other impaired users.

The contents on the front and back side of the virtual flash card can be created in a text form using a keyboard or in an image form using a stylus pen. The contents can also be created in various forms such as video or sound.

In the present invention, a "virtual flash card deck" is defined as a collection of virtual flash cards included in a study course. As shown in FIG. 10, a course objective 540 may be customized for each study course.

The subject area of the study is provided in the form of a study course to the users. This will be described later in the section.

The authoring mode screen includes the following functions: (1) an open function 550 that opens a new card deck; (2) a save function 560 that saves the created card decks; and (3) a share function 570 that provides the selected card decks to other users.

Figure 11:
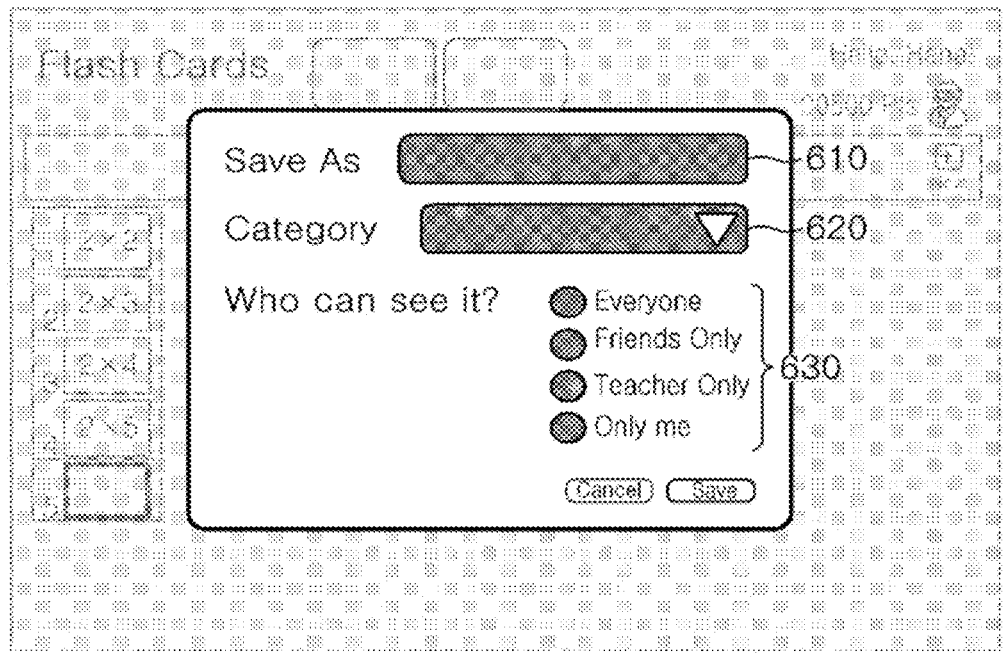
FIG. 11 is an exemplary screen display of the save function on the authoring mode screen as shown on FIG. 10.

FIG. 11 is an exemplary screen display of the save function on the authoring mode screen as shown on FIG. 105.

As illustrated in FIG. 11, an interface screen is displayed when the save function is selected. The interface allows the user to customize the file name 610, category 620, and for sharing purposes, other users who are allowed to use the card deck 630. Upon receiving such entries (inputs), the save function can be enabled to complete the saving process.

File name 610 is the name of the file to be saved. Category 620 is the category in which the virtual flash cards are to be arranged upon being saved. Here, the user can select among the list of categories 620 provided by the system or create a new category for the card deck.

The sharing with other users function 630 allows the user to control which people can utilize the virtual flash card decks. The user may enable all users, registered friends, only teachers, or only the user himself or herself to access the virtual flash card decks.

Figure 12:
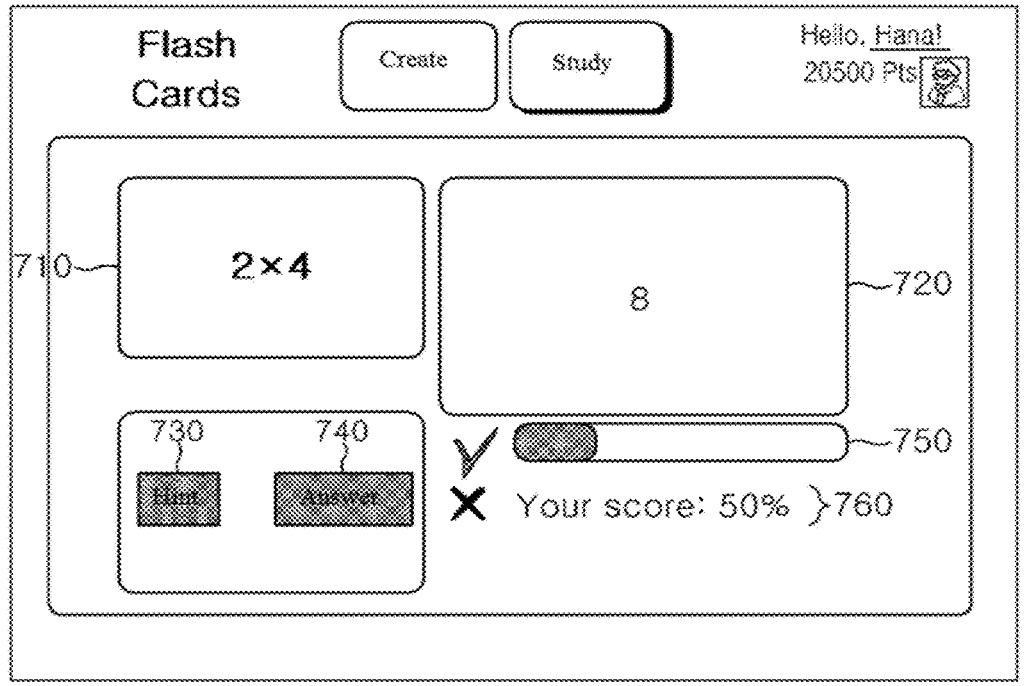
FIG. 12 is an exemplary screen display of the training mode.

FIG. 12 is an exemplary screen display of the training mode.

FIG. 12 illustrates a virtual flash card reviewing the two times multiplication table.

The user may enter the answer in the answer space 720 once the front side of the virtual flash card 710 is displayed. Here, the answer may be entered in the form of text or image by utilizing the keyboard or stylus pen.

The user can request hint by selecting hint 730 before answering the problem. The user may also check the answer on the back side of the virtual flash card by selecting answer 740 after completing the problem.

The user can also check the status of the study course or session through the progress bar 750 on the training mode screen. The training mode screen also provides the current user's progress 760.

A study course is divided into two or more study sessions. For instance, if the user's course objective for SAT Verbal study course is to "master the course in three months," the invention may compute and organize the number and the duration of the study sessions necessary to achieve the course objective throughout the course (i.e., once a week or everyday).

Figure 13:
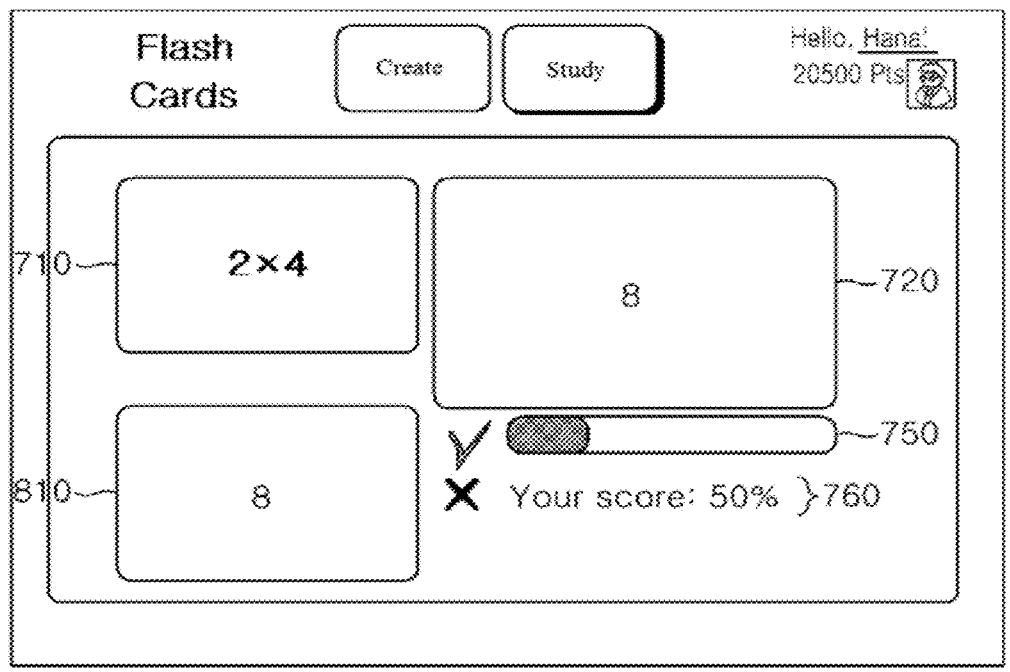
FIG. 13 is an exemplary screen display of the back side of the virtual flash card in training mode.

FIG. 13 is an exemplary screen display of the virtual flash card in training mode.

As illustrated in FIG. 13, the back side of the virtual flash card 810 appears after the user enters his or her answer. The user can then compare his or her answer with the back side of the virtual flash card.

Figure 14:
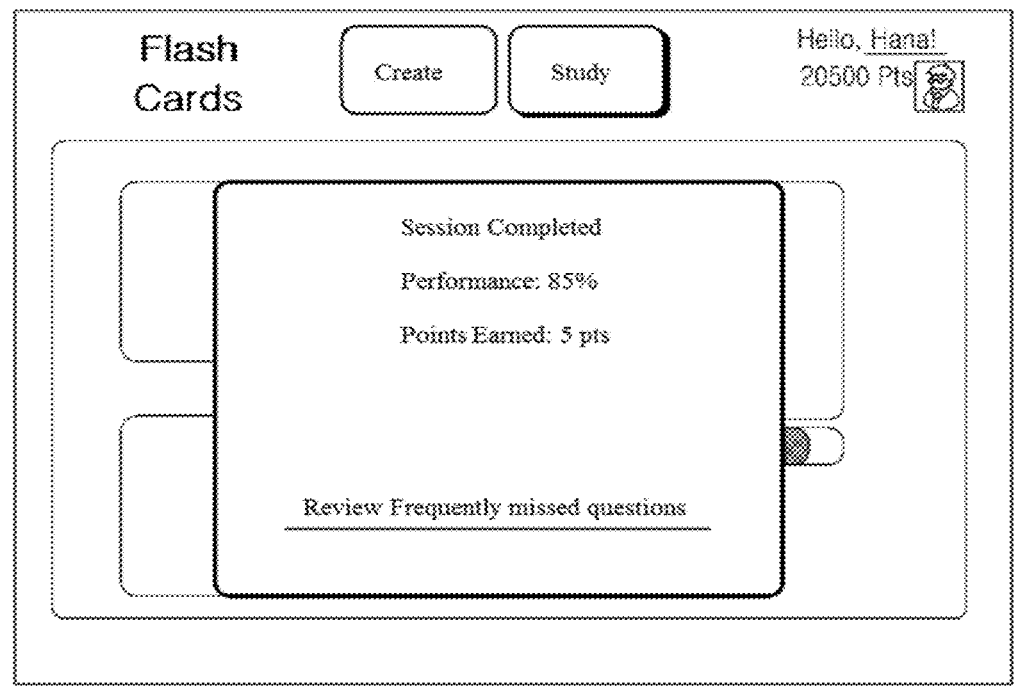
FIG. 14 illustrates an example of the screen that appears at the end of a session.

FIG. 14 illustrates an example of the screen that appears at the end of a session.

As illustrated in FIG. 14, when a study session is completed, a screen that provides the user's performance, points earned, and option to review answers is displayed. Users may also view frequently missed questions.

For instance, user's performance is calculated by dividing the number of virtual flash cards within a certain range of proficiency by the total number of virtual flash cards selected to achieve the course objective and multiplying the result by one hundred (100).

The frequently missed problems or questions can be determined by considering the number of times the problem was answered incorrectly, or the rate and percentage of which the user answered correctly is decreasing. Virtual flash cards selected for review are arranged in order of proficiency level (low to high) or number of times the user answered the problem incorrectly (high to low). The number of virtual flash cards selected for review can be customized.

Points achieved are distributed based on the user's progress. The points can be used to purchase virtual flash cards that other users have created.

Figure 15:
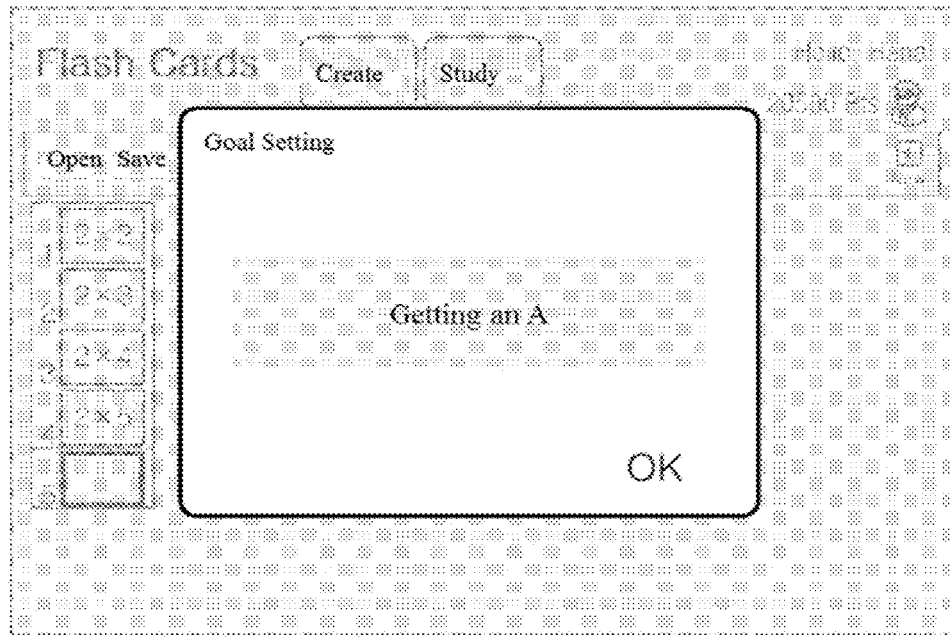
FIG. 15 illustrates an example of the objective (goal) setting screen for a studying subject.

FIG. 15 illustrates an example of the objective (goal) setting screen for a studying subject.

As illustrated in FIG. 15, the customized objective for the subject matter is "getting an A".

Here, such objective may customize a particular virtual flash card deck or it may customize the entire study course.

For example, if the objective is set as "720 on SAT Verbal," the system can automatically set the required percentage of correct answers for the corresponding virtual flash cards so the user can achieve his or her objective.

The system can also provide a list of objectives that the user may choose from, and the user can select an appropriate objective from the list provided.

Figure 16:
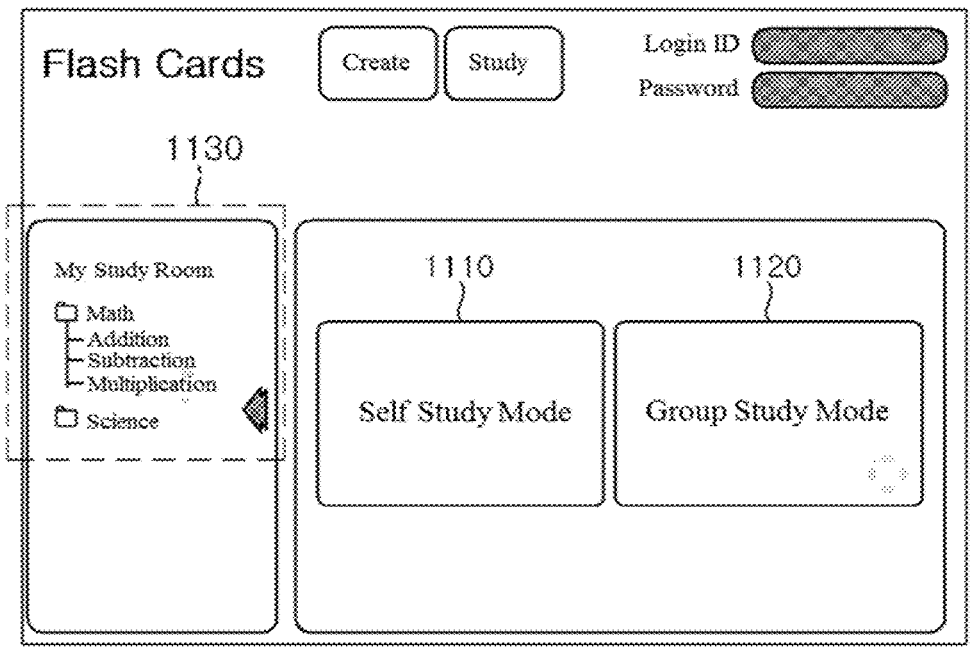
FIG. 16 is another exemplary screen display of the training mode.

FIG. 16 is an exemplary screen display of the training mode.

As shown in FIG. 16, there are two options in the training mode: (1) self-study mode 1110; and (2) group study mode 1120.

Additionally, the "my study room" feature 1130 is available in the training mode. The "my study room" feature 1130 displays the registered study courses organized by categories.

Self-study mode 1110 allows the user to study the course alone. Group study mode 1120 allows the user to study the course with other users online.

Figure 17:
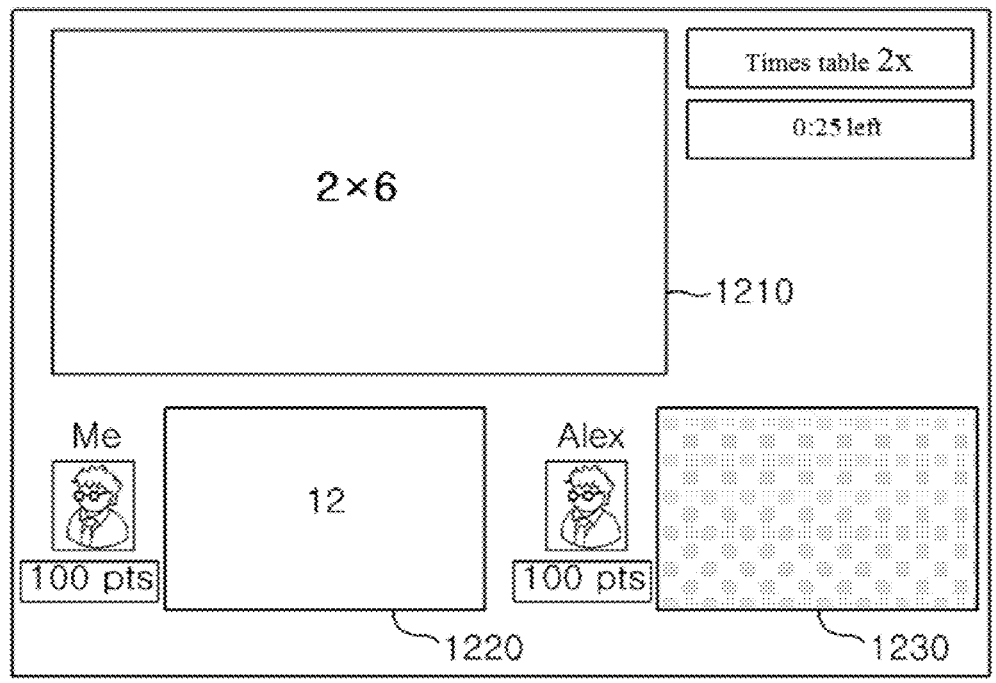
FIG. 17 is an exemplary screen display of the group study mode.

FIG. 17 is an exemplary screen display of the group study mode.

As illustrated in FIG. 17, in group study mode, the problem is displayed on the front side of the virtual flash card 1210 and an answer space 1220 is provided for each user to enter his or her answer. Here, the other user's answer space 1230 is also displayed on the user's screen. However, the other user's answer space 1230 cannot be viewed by the user and the other user's answer is not revealed until after the user completes the problem.

Figure 18:
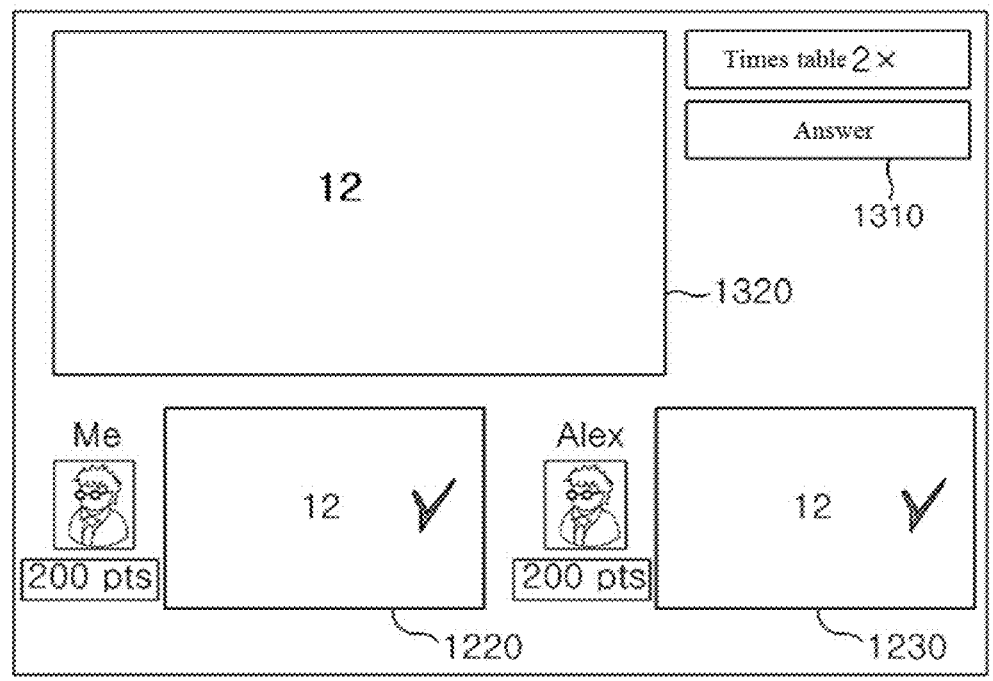
FIG. 18 is an exemplary display of the group study mode after both users entered the answer.

FIG. 18 is an exemplary display of the group study mode after both users entered the answer.

As shown in FIG. 18, the answer button 1310 is enabled once the user enters his or her answer in the answer space 1220. When the user selects the answer button 1310, the back side of the virtual flash card 1320 is displayed and the user can compare his or her answer with the answer on the back side of the virtual flash card. The other user's answer 1230 is also revealed so the user can also compare his or her answer with the other user's answer.

By allowing multiple users to study the course together, the study method described above can maximize the learning benefits of the studying system using virtual flash cards without losing the users' interest.

Figure 19:
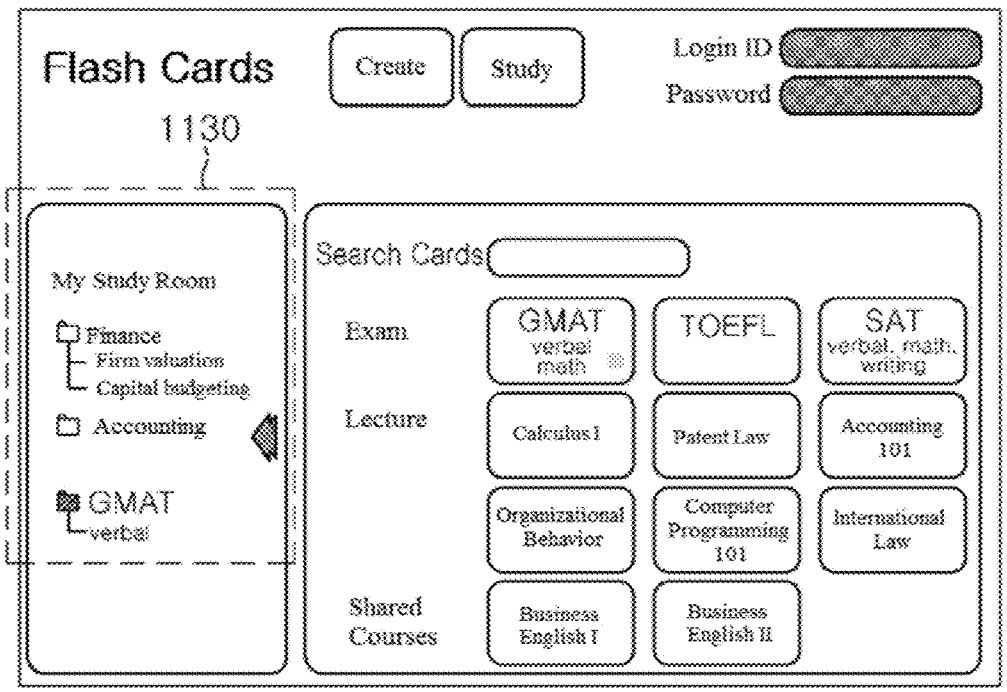
FIG. 19 illustrates other exemplary screen display of the training mode.

FIG. 19 illustrates another exemplary screen display of the training mode.

As illustrated in FIG. 19, the user can select among the study courses displayed on the screen.

The user can also search the study course or virtual flash card decks that he or she would like to study.

Also, the "my study room" feature 1130 is available in the training mode. The "my study room" feature 1130 displays the user's registered study courses organized by categories.

As shown in FIG. 19, the user in this example selected the GMAT course.

Figure 20:
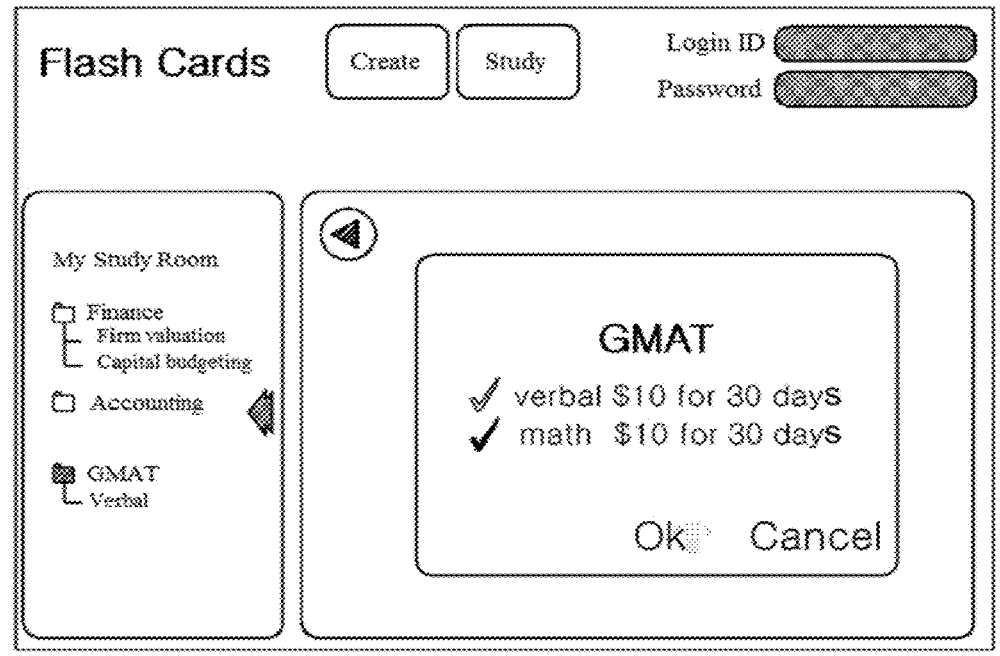
FIG. 20 is an exemplary screen display of the GMAT training course.

FIG. 20 is an exemplary screen display of the GMAT training course.

As illustrated in FIG. 20, GMAT verbal and math courses are each $10 for 30 days. Once the user agrees to the terms of the transaction, he or she may start the course.

Figure 21:
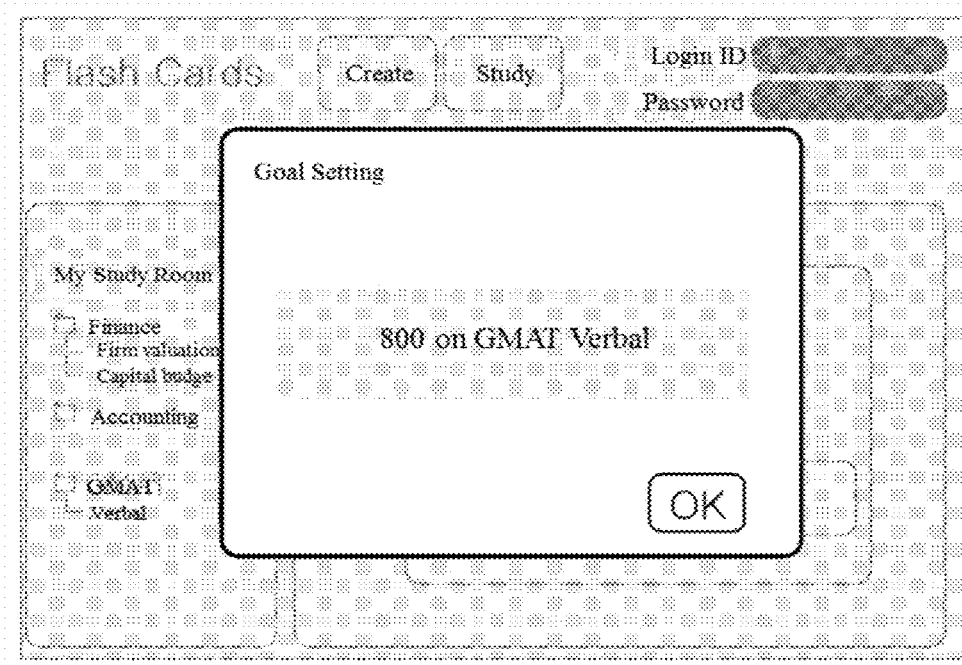
FIG. 21 illustrates an example of the GMAT course objective (goal) setting screen.

FIG. 21 illustrates an example of the GMAT course objective (goal) setting screen.

As shown in FIG. 21, the GMAT course objective is customized as "800 on GMAT Verbal."

Figure 22:
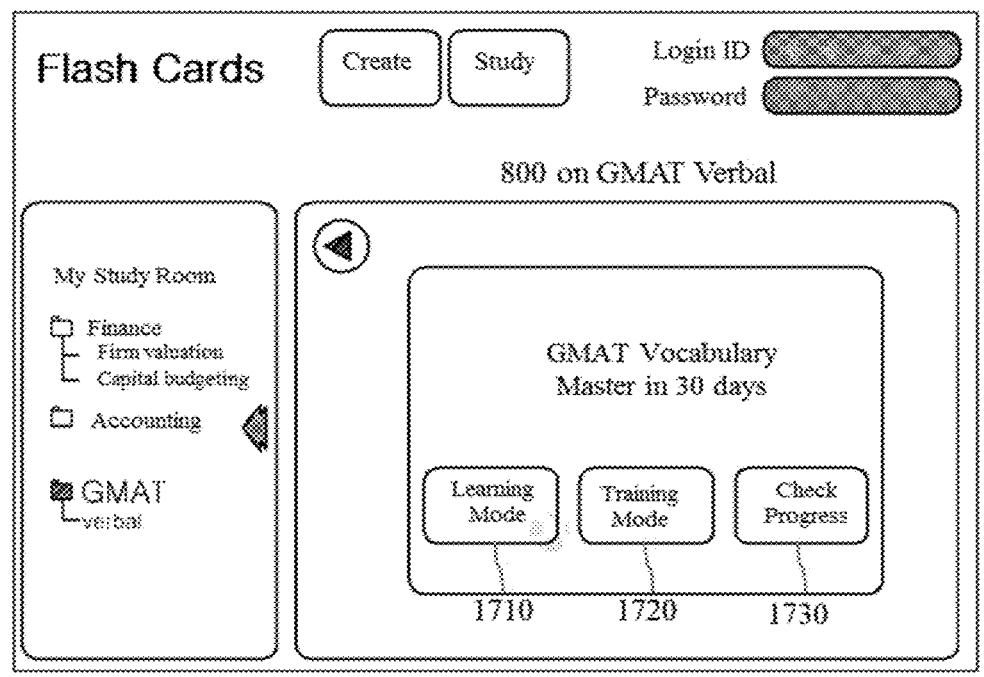
FIG. 22 illustrates an example of the mode selection screen after customization of GMAT course objective (goal).

FIG. 22 illustrates an example of the mode selection screen after the user customizes GMAT course objective (goal).

As shown in FIG. 22, learning mode 1710, training mode 1720, and check progress mode 1730 are displayed upon customization of the GMAT course objective.

In the example in FIG. 22, the user selected learning mode 1710.

Figure 23:
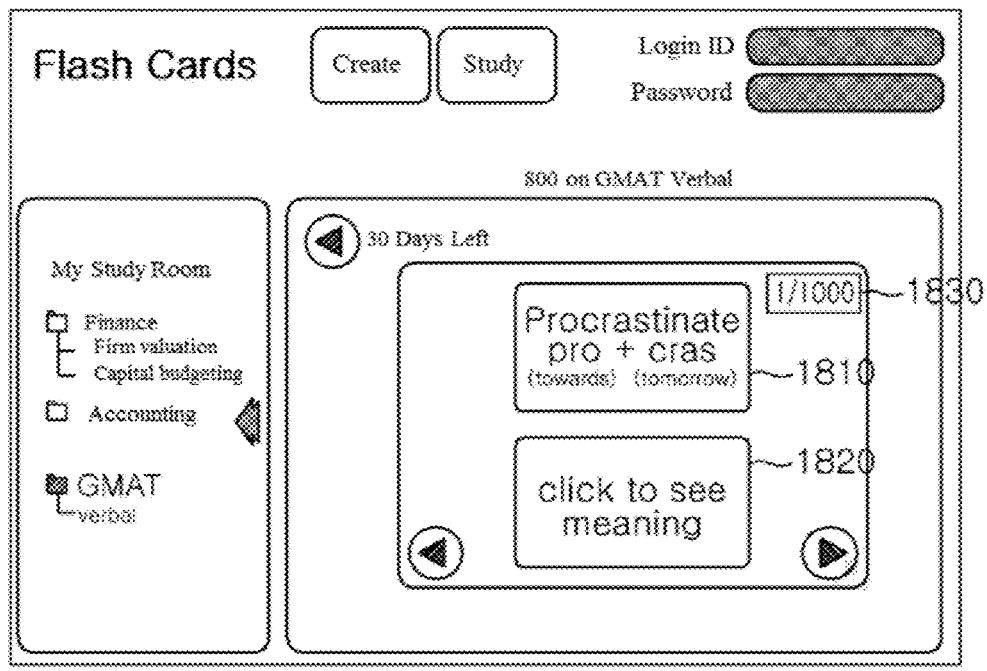
FIG. 23 is an exemplary screen display of the learning mode in GMAT course.

FIG. 23 is an exemplary screen display of the learning mode in GMAT course.

As illustrated in FIG. 23, the front side of the virtual flash card 1810 is displayed in GMAT course learning mode. The user may also select to display the back side of the virtual flash card 1820 to see the answer.

Also shown in FIG. 23, the user can monitor which number of virtual flash card is being displayed 1830.

The user can complete a course relatively faster in learning mode since the user is not required to enter an answer.

The user can skip or go back by clicking the arrows displayed on the screen.

Figure 24:
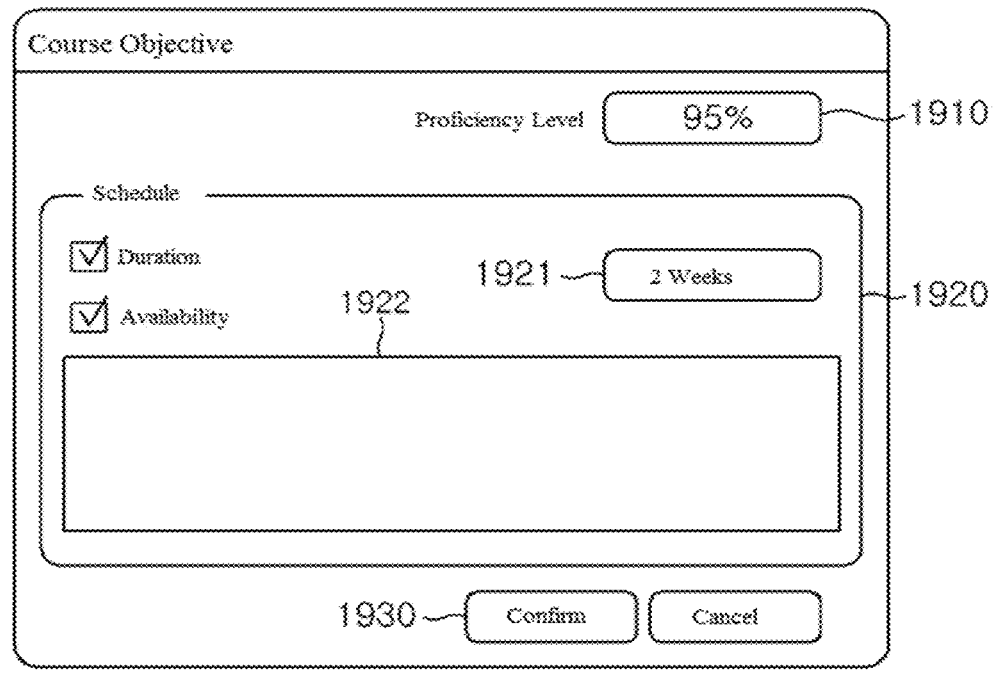
FIG. 24 illustrates an example of the course objective (goal) setting screen.

FIG. 24 illustrates an example of the course objective (goal) setting screen.

As shown in FIG. 24, the user may customize the proficiency level.

Also shown in FIG. 24, the proficiency level 1910 is customized as 95%. The proficiency level can be defined differently depending on the study course. For example, proficiency level can be defined as the number of virtual flash cards required to be answered correctly. Furthermore, the desired proficiency level can be changed for each learning session in the course. For example for the first session, the user may want to achieve 50% of proficiency, whereas for the second session, he or she may set the proficiency level to be 75%.

The user can also arrange the course schedule by utilizing the scheduling feature 1920.

The scheduling feature 1920 includes entry of duration 1921 and entry of availability 1922.

The user can enter the duration of the study course 1921. In the example in FIG. 24, the duration is customized as two weeks.

The user can also enter his or her availability 1922 (date and time the user is available to study).

When the user finishes arranging his or her course schedule, the user may click "OK" 1930 and the client training feature will calculate, organize and display the course schedule. The user can also manually edit the provided course schedule.

Figure 25:
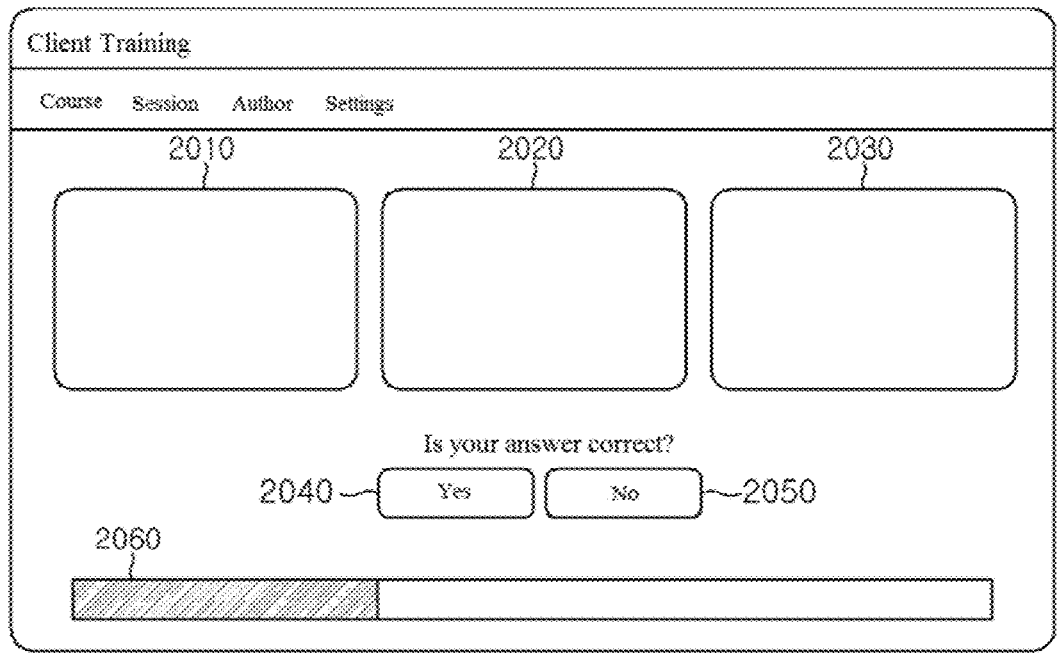
FIG. 25 illustrates an example of the answer display screen.

FIG. 25 illustrates an example of the answer display screen.

The answer display screen appears after the user completes a problem. As illustrated in FIG. 25, the answer display screen includes the front side display 2010, user's entry display 2020, and the back side display 2030.

The front side display 2010 illustrates the front side of the virtual flash card or the problem the user needs to answer.

The user's entry display 2020 illustrates the answer that the user entered for the corresponding virtual flash card.

The back side display 2020 illustrates the back side of the virtual flash card or the answer to the problem on the front side of the corresponding virtual flash card.

The user can manually score his or her answer by comparing his or her answer with the answer on the back side of the virtual flash card. The user may click "yes" 2040 if he or she answered correctly, or "no" 2050 if he or she answered incorrectly.

FIG. 25 is an example of an answer display screen that appears during the study session. Such answer display screen includes session progress bar 2060 which tracks the user's progress in the session.

Figure 26:
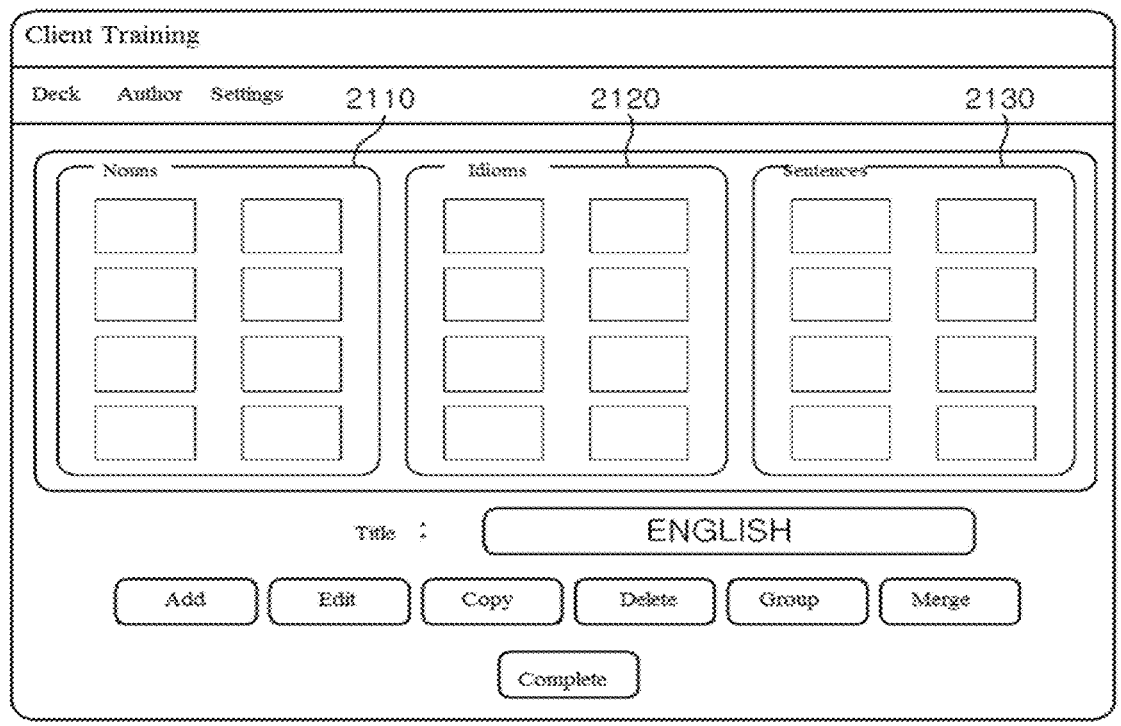
FIG. 26 is an exemplary screen display of the authoring mode.

FIG. 26 is an exemplary screen display of the authoring mode.

FIG. 26 illustrates noun deck 2110, idiom deck 2120, and sentence deck 2130 under the title "English."

The user can add, edit, copy, delete, or merge virtual flash card decks. The user can also move virtual flash card decks to certain groups.

In certain embodiments, the authoring mode can be started by the authoring menu. The authoring menu provides the following options: (1) "new deck," which creates new virtual flash card decks; (2) "edit deck," which edits existing virtual flash card decks; and (3) "import/export deck," which imports/exports virtual flash card decks through network.

If the user selects "new deck" or "edit deck" from the authoring menu, a deck menu is provided to the user.

The user may select the following options from the deck menu: (1) add card; (2) edit card; (3) copy card; (4) delete card; (5) merge deck; or (6) organize deck.

The add card option allows the user to add a new virtual flash card to the virtual flash card deck. The edit card option allows the user to edit a particular virtual flash card in a virtual flash card deck. After completing the add card option, the system can automatically execute the edit card option.

The copy card option allows the user to copy a particular virtual flash card. The delete card option allows the user to delete a certain virtual flash card from the virtual flash card deck. The merge deck option creates a new virtual flash card deck by merging more than two existing virtual flash card decks. The organize deck option arranges the order of the virtual flash cards. Here, the order determined by organize deck option can be similar to the training mode's quiz type order. However, the learning mode sequence would be more beneficial in this case.

Having thus described the invention in rather full detail, it will be understood that such detail need not be strictly adhered to, but that additional changes and modifications may suggest themselves to one skilled in the art. Accordingly, the specification and drawings are to be regarded in an illustrative rather than a restrictive sense.

What is claimed is:

1. A system comprising:
   a control unit including a memory configured to store program instructions and a processor configured to execute the stored program instructions;
   a network interface enabling communication between the control unit and a plurality of remotely located user terminals in a network; and
   at least one database storing a plurality of virtual flash cards, each of which including a plurality of virtual sides and content associated with the plurality of virtual sides, and storing study session information and user performance history information,
   wherein, when the program instructions are executed by the processor, the processor is configured to:
      (a) receive, via the network interface, a request over the network from a user termini of a user to generate a study session, during which one or more of the stored plurality of virtual flash cards are presented to the user at the user terminal;
      (b) determine a goal or a length of the study session;
      (c) access user performance history information stored in the at least one database;
      (d) select virtual flash cards among the plurality of virtual flash cards stored in the al least one database based on the accessed user performance history information and assign the selected virtual flash cards to the study session;
      (e) connect, via the network interface, to the user terminal to carry out the study session by transmitting study session information over the network to the user terminal, such that the virtual flash cards assigned to the study session are presented to the user at the user terminal; and
      (f) receive, via the network interface, information indicating answers entered by the user through an interface provided at the user terminal over the network in response to the presented virtual flash cards,
   wherein the control unit selects virtual flash cards to be assigned to the study session that increase productivity of the study session in view of:
   1) the determined goal or length of the study session by comparing data associated with each virtual flash card obtained during one or more previous study sessions to one or more threshold values, the data including one or more of:
      i) a rate and percentage of correct answers, or a trend of the rate and percentage of correct answers, given by the user and other users for virtual flash cards during the one or more previous study sessions, and
      ii) a time needed for the user and the other users to answer or solve virtual flash cards during the one or more previous study sessions, and
   2) an amount of time remaining prior to occurrence of a predefined goal.

2. A method comprising:
   receiving, at a control unit via a network interface, a request over a network from a user terminal of a user to generate a study session, during which one or more virtual flash cards are presented to the user at the user terminal,
   wherein the control unit includes a memory configured to store program instructions and a processor configured to execute the stored program instructions, and the network interface enables communication between the control unit and a plurality of remotely located user terminals in the network;
   determining, by the control unit, a goal or a length of the study session;
   accessing, by the control unit, user performance history information stored in at least one database;
   selecting, by the control unit, virtual flash cards among a plurality of virtual flash cards stored in the at least one database based on the accessed user performance history information;
   assigning, by the control unit, the selected virtual flash cards to the study session;
   connecting, by the control unit via the network interface, to the user terminal to carry out the study session by transmitting study session information over the network to the user terminal, such that the virtual flash cards assigned to the study session are presented to the user at the user terminal; and
   receiving, at the control unit via the network interface, information indicating answers entered by the user through an interface provided at the user terminal over the network in response to the presented virtual flash cards,
   wherein the control unit selects virtual flash cards to be assigned to the study session that increase productivity of the study session in view of:
   1) the determined goal or length of the study session by comparing data associated with each virtual flash card obtained during one or more previous study sessions to one or more threshold values, the data including one or more of:
      i) a rate and percentage of correct answers, or a trend of the rate and percentage of correct answers, given by the user and other users for virtual flash cards during the one or more previous study sessions, and
      ii) a time needed for the user and the other users to answer or solve virtual flash cards during the one or more previous study sessions, and
   2) an amount of time remaining prior to occurrence of a predefined goal.

3. A system comprising:
   a control unit including a memory configured to store program instructions and a processor configured to execute the stored program instructions;
   a network interface enabling communication between the control unit and a plurality of remotely located user terminals in a network; and
   at least one database storing course scheduling information for scheduling a study course including a plurality of study sessions,
   wherein, when the program instructions are executed by the processor, the processor is configured to:
      (a) receive, via the network interface, a request over the network from a user terminal of a user to generate a study course including a plurality of study sessions, the request indicating a goal or a length of the study course and an availability of the user;
      (b) in response to the received request, generate a study schedule for the study course;
      (c) access course scheduling information stored in the at least one database;
      (d) set a starting time or a length of a study session of the plurality of study sessions based on the accessed course scheduling information; and
      (e) connect, via the network interface, to the user terminal to carry out the study session by transmitting study session information over the network to the user terminal in accordance with the set starting time or length of the study session, wherein the control unit sets the starting time or the length of the study session to increase productivity of the study session in view of:
1) the goal or length of the study course and the availability of the user by selecting a starting time or length of the study session using data obtained during one or more previous study sessions including one or more of:
   i) a rate and percentage of correct answers, or a trend of the rate and percentage of correct answers, given by the user and other users during the one or more previous study sessions, and
   ii) a time needed for the user and the other users to provide correct answers during the one or more previous study sessions, and
2) an amount of time remaining prior to occurrence of a predefined goal.

4. A method comprising:
receiving, at a control unit via a network interface, a request over a network from a user terminal of a user to generate a study course including a plurality of study sessions, the request indicating a goal or a length of the study course and an availability of the user;
wherein the control unit includes a memory configured to store program instructions and a processor configured to execute the stored program instructions, and the network interface enables communication between the control unit and a plurality of remotely located user terminals in the network;
in response to the received request, generating, by the control unit, a study schedule for the study course;
accessing, by the control unit, course scheduling information stored in at least one database;
setting, by the control unit, a starting time or a length of a study session of the plurality of study sessions based on the accessed course scheduling information; and
connecting, by the control unit via the network interface, to the user terminal to carry out the study session by transmitting study session information over the network to the user terminal in accordance with the set starting time or length of the study session,
wherein the control unit sets the starting time or the length of the study session to increase productivity of the study session in view of:
1) the goal or length of the study course and the availability of the user by selecting a starting time or length of the study session using data obtained during one or more previous study sessions including one or more of:
   i) a rate and percentage of correct answers, or a trend of the rate and percentage of correct answers, given by the user and other users during the one or more previous study sessions, and
   ii) a time needed for the user and the other users to provide correct answers during the one or more previous study sessions, and
2) an amount of time remaining prior to occurrence of a predefined goal.

* * * * *